United States Patent [19]

Borza

[11] Patent Number: 6,076,167

[45] Date of Patent: Jun. 13, 2000

[54] METHOD AND SYSTEM FOR IMPROVING SECURITY IN NETWORK APPLICATIONS

[75] Inventor: Stephen J. Borza, Ottawa, Canada

[73] Assignee: DEW Engineering and Development Limited, Ottawa, Canada

[21] Appl. No.: 08/907,958

[22] Filed: Aug. 11, 1997

Related U.S. Application Data

[60] Provisional application No. 60/032,347, Dec. 4, 1996.

[51] Int. Cl.[7] .............................. H04K 1/00; G06F 12/14
[52] U.S. Cl. .............................. 713/201; 713/202; 380/3; 380/25
[58] Field of Search ........................ 395/187.01, 188.01, 395/200.59; 713/201, 202; 709/229; 380/4, 23, 25

[56] References Cited

U.S. PATENT DOCUMENTS

| | | | |
|---|---|---|---|
| 4,484,025 | 11/1984 | Ostermann et al. | 178/22.09 |
| 4,964,163 | 10/1990 | Berry | 380/23 |
| 5,153,918 | 10/1992 | Tuai | 380/25 |
| 5,784,566 | 7/1998 | Viavant et al. | 395/59 |

*Primary Examiner*—Robert W. Beausoliel, Jr.
*Assistant Examiner*—Brian H. Shaw
*Attorney, Agent, or Firm*—Neil Teitelbaum & Associates

[57] ABSTRACT

A method of enhancing network security is provided for a communication session initiated between a first computer and a second other computer. From the first computer to the second computer in communications therewith a process for securing communications therebetween is transmitted. One such process is a biometric characterisation process for characterising fingerprints. The process is for execution on the second computer and is selected to be compatible therewith. Communications from the second computer to the first computer are secured using the transmitted process on the second computer and using, on the first computer, a compatible process to the transmitted process. The host computer can modify or replace the process or data particular to the process before each session, during a session, or at intervals.

18 Claims, 19 Drawing Sheets

Fig. 8b

Please provide Fingerprint from left ring finger.
Please provide Fingerprint from right thumb.
Please provide Fingerprint from right index finger.

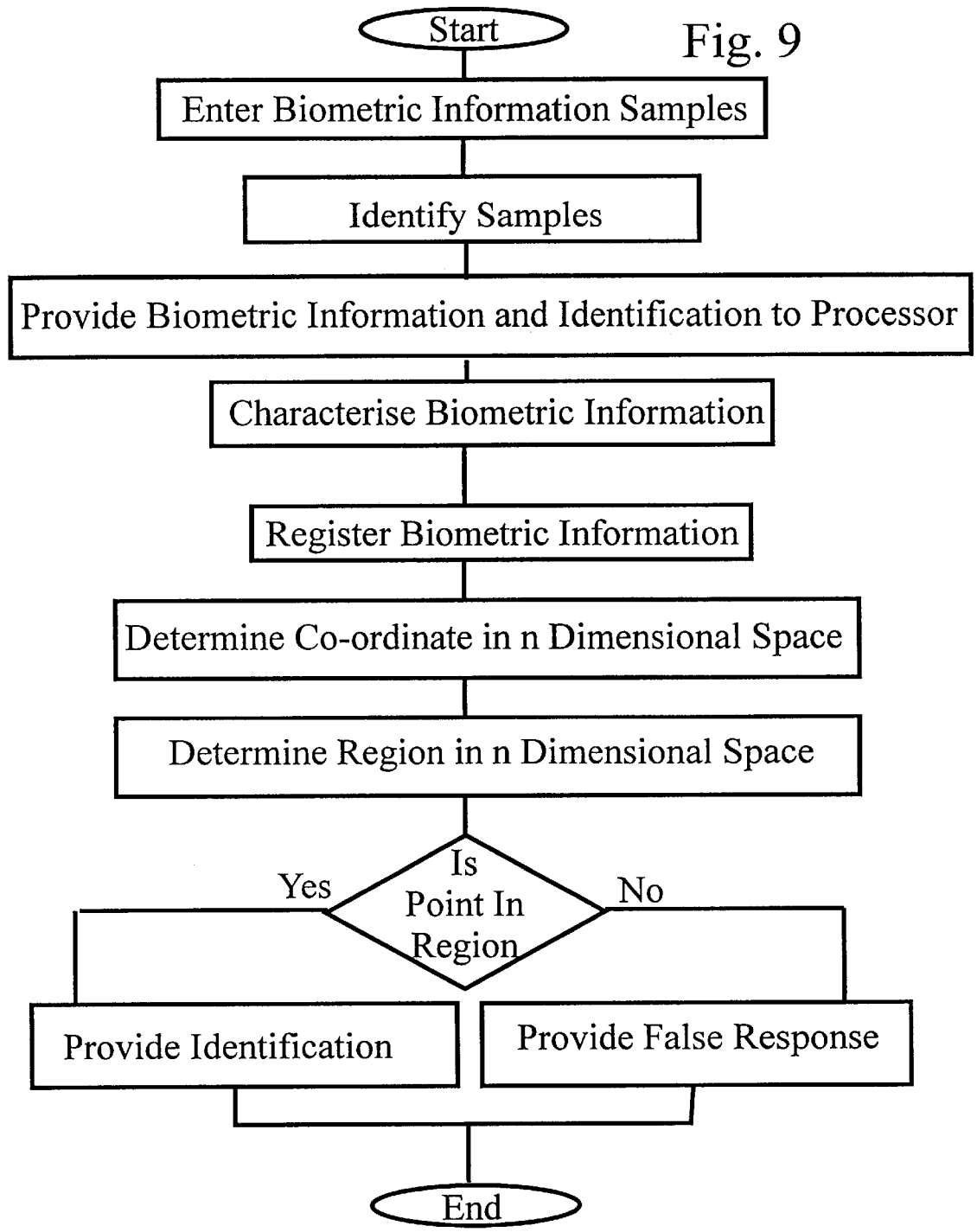

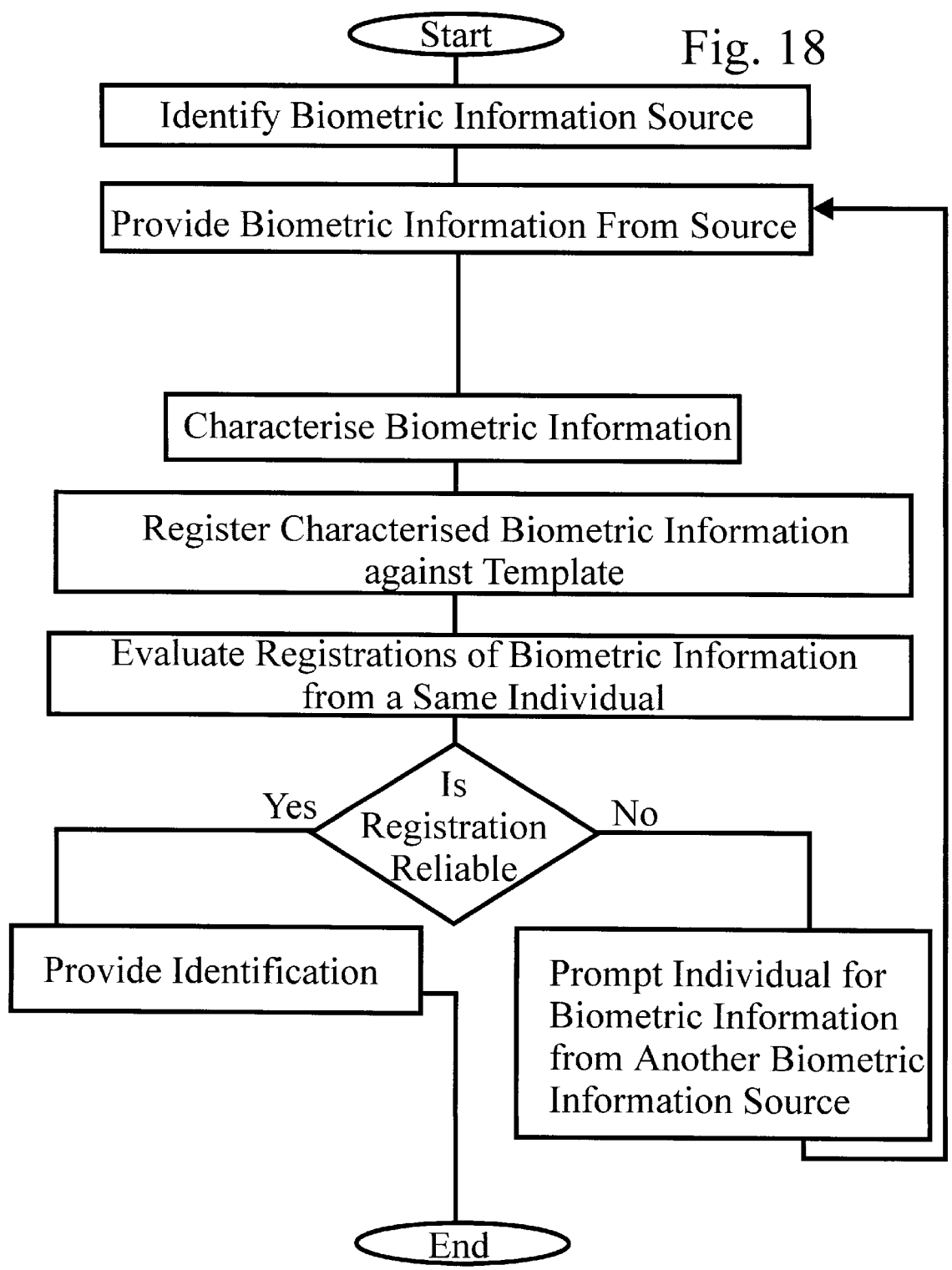

METHOD AND SYSTEM FOR IMPROVING SECURITY IN NETWORK APPLICATIONS

CROSS REFERENCE TO RELATED APPLICATIONS

This application claims priority from a provisional application Ser. No. 60/032,347 filed Dec. 4, 1996. That provisional application is incorporated herein by reference for all purposes.

FIELD OF THE INVENTION

This invention relates generally to computer network communications. More particularly this invention relates to network security and remote execution of security processes.

BACKGROUND OF THE INVENTION

The Internet is one of the fastest growing and ubiquitous modes of commerce. Many companies have Internet servers prepared for commercial delivery of goods and services. At first, the products found on the Internet or more specifically, the world wide web (WWW) were computer-based products, but today, more and more businesses are competing to set up commercial services on the world wide web.

A common problem with the Internet is a lack of secure communication channels. In order for hospitals, governments, banks, stock brokers, and credit card companies to make use of the Internet, privacy and security must be ensured. Further, many consumers are hesitant about providing credit card information via the Internet.

One approach to solving the aforementioned problem uses data encryption. A server is provided with an encryption unit; and, encryption keys are stored within the encryption unit. A known encryption algorithm is used such as a public-key/private-key system. In use, a user sends information in an encrypted form so that only the encryption means using a private-key can decrypt (or decipher) the encrypted information. Upon receiving the information, an Internet server provides it to an encryption means for decryption. Decrypted data is passed back to the Internet server. Often, the encryption means forms part of the server.

Likewise, when information is to be sent to a recipient and is of a confidential nature, it is passed to the encryption means for encryption using a public-key prior to transmission. In this way, data is passed in a more secure fashion and access to the encryption keys is limited.

Another encryption scheme commonly used makes use of session-keys which are exchanged each time a connection is made and which change with each connection to a server. Using session-keys, limits the amount of data encrypted with a given key and thereby enhances security. Unfortunately, most session keys are generated using a predictable algorithm which provides significant security against common access but limited security against experienced security experts.

Presently, most implementations of security encryption rely on an algorithm existent in both the server and a client computer. Such algorithms are incorporated in popular network software such as Netscape Navigator®. An encryption key is exchanged and a computer, using a standard algorithm as incorporated into many network software packages, performs encryption of data for transmission and decryption of data upon receipt.

OBJECT OF THE INVENTION

Thus, in an attempt to overcome these and other limitations of known prior art devices, it is an object of this invention to provide a method for securely transmitting data across a network that is not confined to a single encryption algorithm.

It is a further object of this invention to provide a method for securely transmitting data across a network that is capable of real time modification in order to increase security.

SUMMARY OF THE INVENTION

In accordance with the invention, there is provided a method of enhancing network security comprising the steps of:

(a) initiating a communication session between a first computer and a second other computer;

(b) transmitting from the first computer to the second other computer in communications therewith a process for securing communications therebetween;

(c) securing communications on the second other computer using said process; and (d) securing communications on the first computer using a process associated with the transmitted process.

In accordance with the invention, there is provided a method of enhancing network security comprising the steps of:

(a) initiating a communication session between a first computer and a second other computer;

(b) transmitting from the first computer to the second other computer in communication therewith a process for characterising user authorisation information;

(c) characterising user authorisation information received at the second other computer to produce data using the process for characterising user authorisation information;

(d) transmitting the data to the first computer; and (e) comparing the data received by the first computer to information on the first computer to determine a value and when the value is within predetermined limits performing one of identifying a source of the biometric information and authorising access from the second other computer to information secured by the first computer.

In accordance with another embodiment of the invention, there is provided a method of enhancing network security comprising the steps of:

(a) initiating a communication session between a first computer and a second other computer;

(b) transmitting from the first computer to the second other computer in communication therewith a process for characterising biometric information, the process comprises the steps of:

accepting a first biometric information sample from a biometric source of the individual to a biometric input device in communication with a host processor;

using the processor of the second other computer, characterising the biometric information sample;

(c) executing the process on the second other computer;

(d) transmitting the characterised first biometric information to the first computer;

(e) using the processor of the first computer, registering the characterised first biometric information sample with a first template to produce a first registration value;

(f) when the first registration value is within predetermined limits, identifying the individual;

(g) when the first registration value is within other predetermined limits, transmitting a signal indicative of such to the second other computer and performing the steps of:
  (g1) executing the process on the second other computer with another different biometric information source;
  (g2) transmitting the characterised first biometric information to the first computer;
  (g3) using the processor of the first computer, registering the current biometric information sample with a template to produce a current registration value;
  (g4) when the first registration value and the current registration value are within predetermined limits, identifying the individual; and
  (g5) when the first registration value and the current registration value are within second other predetermined limits, repeating step (g).

BRIEF DESCRIPTION OF THE DRAWINGS

Exemplary embodiments of the invention will now be described in conjunction with the following drawings, in which:

FIG. 8b is a simplified diagram of a display having prompts thereon requesting provision of biometric information from predetermined biometric information sources;

FIG. 9 is a flow diagram of another method of providing biometric information and identifying a user in dependence thereon according to the invention;

FIG. 18 is a flow diagram of another method of providing biometric information and identifying an individual in dependence thereon according to the invention.

DETAILED DESCRIPTION OF THE INVENTION

Network security is an essential feature for enabling commerce via a public computer network such as the Internet and for enabling access to confidential information via a public computer network. Presently, encryption methods rely on private-key/public-key algorithms incorporated into both a first computer in the form of a server and a second computer in the form of a client computer.

Figure 1:
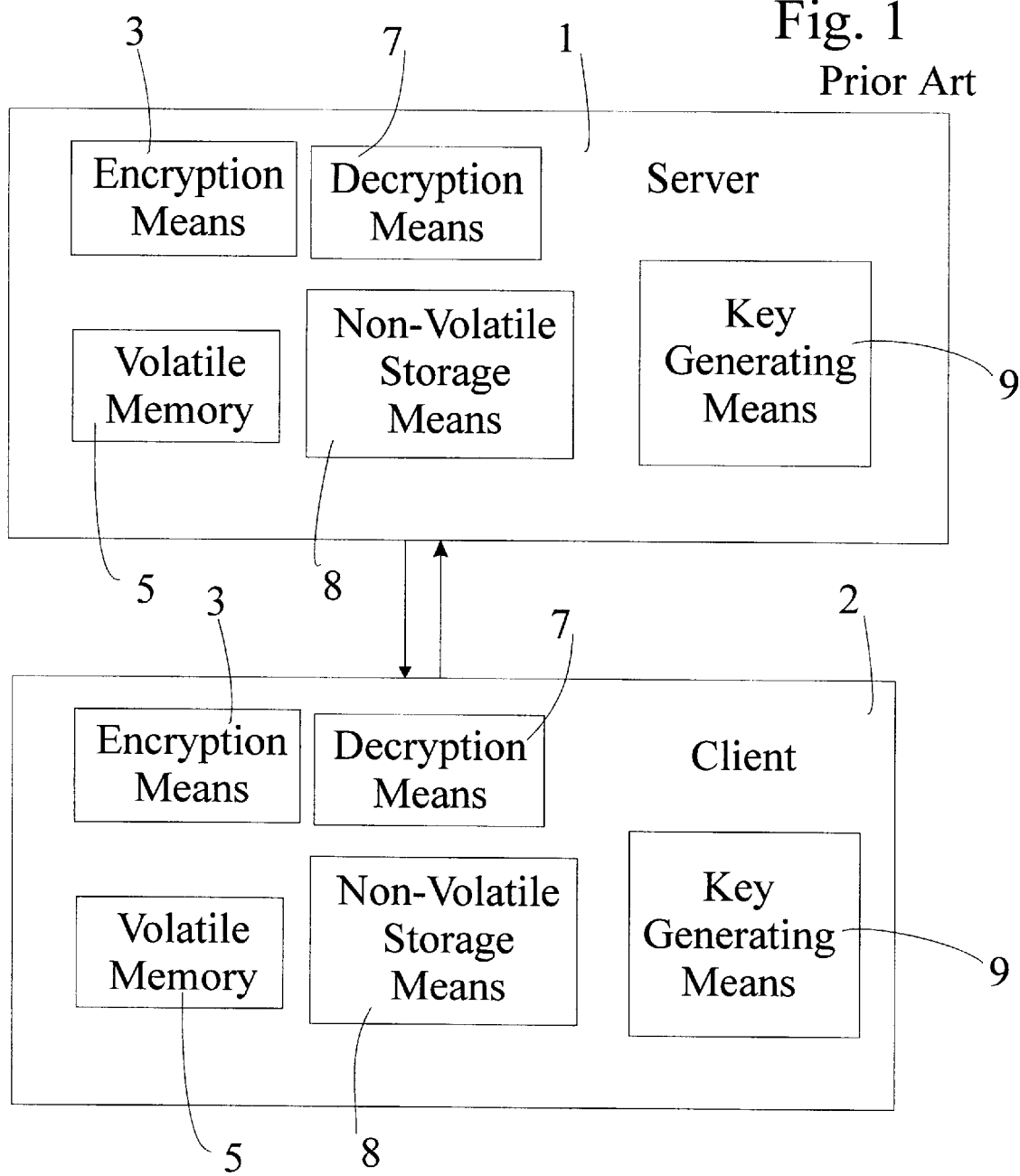
FIG. 1 is a simplified diagram of a first computer and a second computer having a network therebetween and in communication according to the prior art.

Referring to FIG. 1, a system according to the prior art is shown for implementing network security. A server 1 is provided with encryption means 3 for encrypting data prior to transmission via a public network. The encryption means 3 uses a public-key provided by another party to a communication and stored in volatile memory 5. The server is further provided with a decryption means 7 for deciphering received encrypted data. In order to decipher the data, a private-key is required. The private-key is stored in a non-volatile storage means 8. The private-key is generated by a private-key generating means 9 or alternatively is stored in the non-volatile storage means 8 during manufacture.

A client computer 2 is provided with similar components in the form of encryption means 23 for encrypting data prior to transmission via a public network. The encryption means 23 uses a public-key provided by another party to a communication and stored in volatile memory 25. The server is further provided with a decryption means 27 for deciphering received encrypted data. In order to decipher the data, a private-key is required. The private-key is stored in a non-volatile storage means 28. The private-key is generated by a private-key generating means 29 or alternatively is stored in the non-volatile storage means 28 during manufacture.

Figure 2:
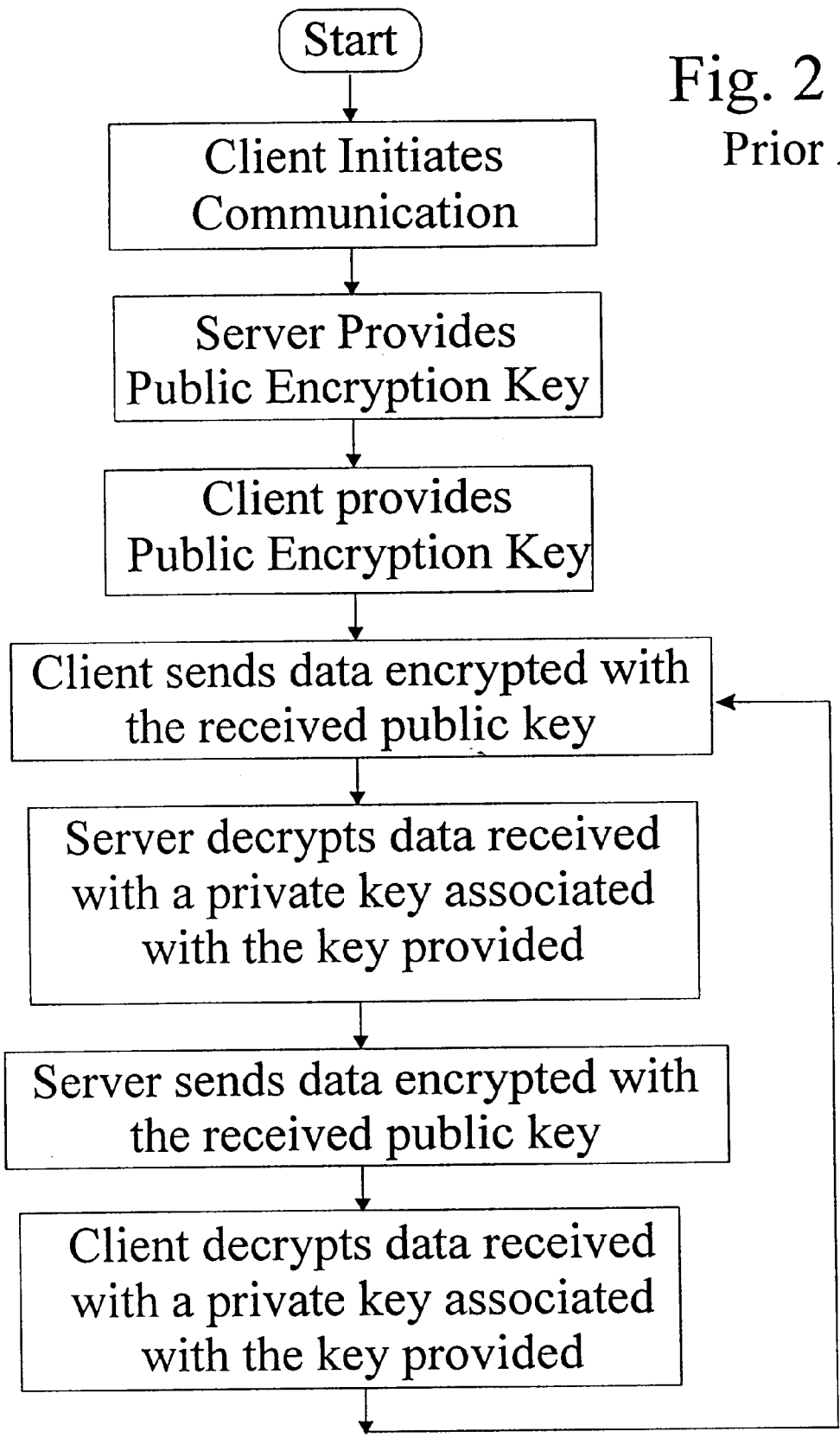
FIG. 2 is a flow diagram of a method of providing computer security according to the prior art.

Referring to FIG. 2, a method of providing network security according to the prior art is shown. The client computer 2 initiates communication with the server 1. The server, upon authorising access by the client computer 2, provides to the client computer 2 a public-key associated with a private-key stored in the non-volatile storage means 8. The client computer 2 responds by providing a public-key to the server 1 associated with a private-key stored in the non-volatile storage means 28. Data for transmission from the client computer 2 to the server 1 is encrypted in the encryption means 23 using a predetermined encryption algorithm and the public-key associated with the private-key stored in the non-volatile storage means 8 prior to transmission to the server 1. When the data is received by the server 1, it is deciphered by the decryption means 7 using a predetermined corresponding decryption algorithm and the associated private-key. Similarly, data for transmission from the server 1 to the client computer 2 is encrypted in the encryption means 3 using the public-key associated with the private-key stored in the non-volatile storage means 28 prior to transmission to the client computer 2. When the data is received by the client computer 2 it is deciphered by the decryption means 27 using the associated private-key. In this fashion, data is transmitted and received securely.

Alternatively, the private-key is generated as needed and stored in volatile memory. An associated public-key is generated in dependence upon the generated private-key and stored associated with the private-key in volatile memory 5 or 25.

It is evident to those of skill in the art that implementation of security according to the prior art requires standardisation of encryption algorithms and processes either through the use of software form a same vendor or through the use of a standard encryption algorithm. There are disadvantages to each of these approaches in that using a common vendor reduces flexibility and maintainability, while using a standard encryption algorithm reduces security.

Figure 3:
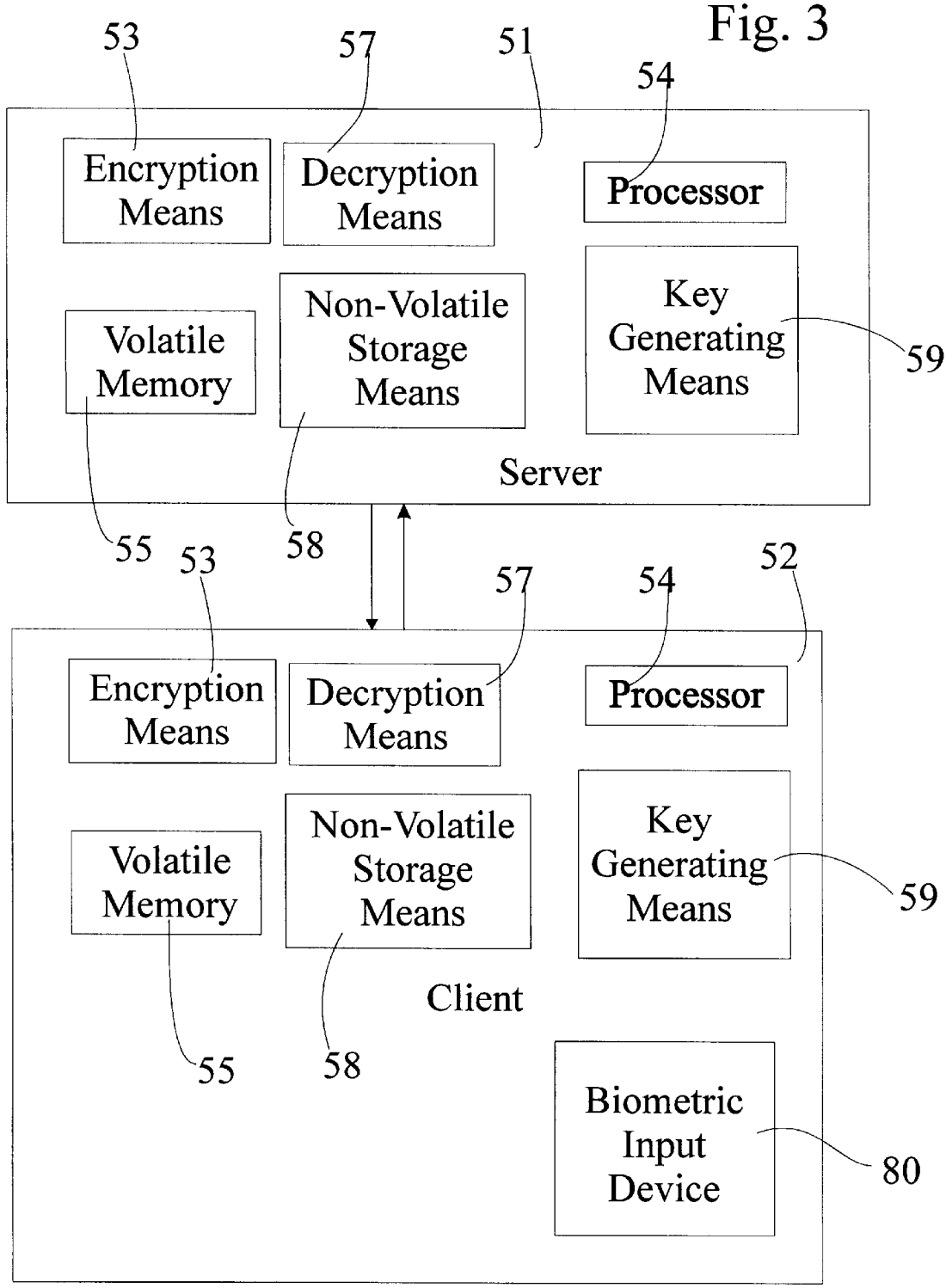
FIG. 3 is a simplified diagram of a first computer and a second computer having a network therebetween and in communication according to the invention.

Referring to FIG. 3, a simplified diagram of a system for use with the present invention is shown. A server 1 is provided with encryption means 53 for encrypting data prior to transmission via a public network. The encryption means 53 uses a public-key provided by another party to a communication and stored in volatile memory 55. The server is further provided with a decryption means 57 for deciphering received data encrypted with said key. In order to decipher the data, a private-key is required. The private-key is stored in a non-volatile storage means 58. The private-key is generated by a private-key generating means 59 or, alternatively, is stored in the non-volatile storage means 58 during manufacture.

A client computer 52 is provided with similar components in the form of encryption means 73 for encrypting data prior to transmission via a public network. The encryption means 73 uses a public-key provided by another party to a communication and stored in volatile memory 75. The server is further provided with a decryption means 77 for deciphering received encrypted data. In order to decipher the data, a private-key is required. The private-key is stored in a non-volatile storage means 78. The private-key is generated by a private-key generating means 79 or alternatively is stored in the non-volatile storage means 78 during manufacture. Both the server and the client comprise a processor 54. Optionally, the processor 54, the encryption means 53, and the decryption means 57 are a same processor means.

Figure 4:
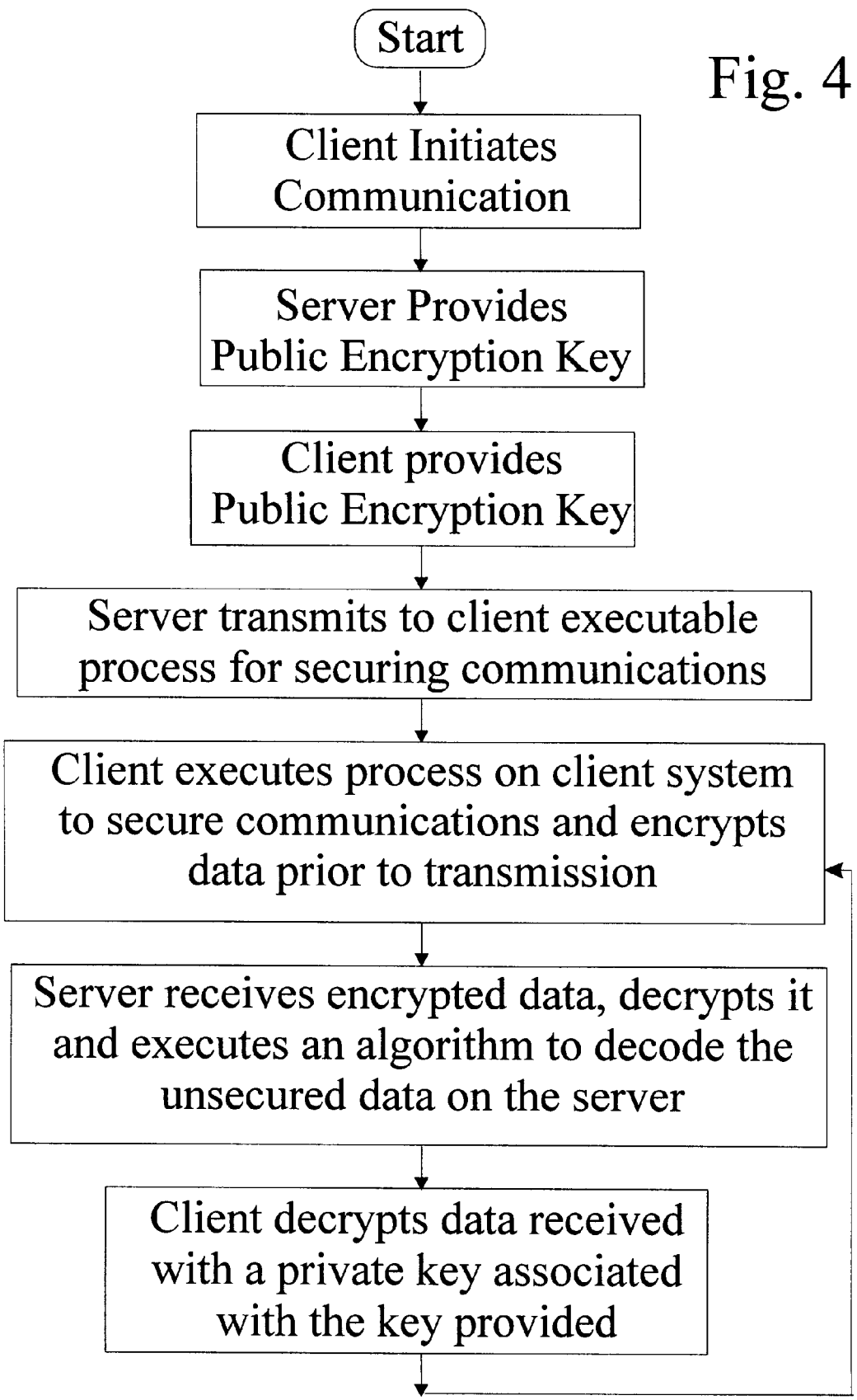
FIG. 4 is a flow diagram of a method of providing computer security according to the present invention.

Referring to FIG. 4, a flow diagram of a method according to the present invention for transmitting information in a secure fashion is shown. The client computer 52 initiates communications with the server 51. The server 51 and the client computer 52 exchange public-keys according to the prior art. Optionally, the second public-key transferred may be encrypted using the first public-key. The server 51 prepares a security process for transmission to the client computer 52. The preparation comprises selecting a security process, formatting the process for implementation on the client computer 52, and encrypting the resulting data representative of said prepared process. The prepared process is then transmitted from the server 51 to the client computer 52 where it is received and deciphered. The client computer 52 uses the prepared process to process data prior to transmission to the server 51. The processed data is encrypted using the public-key received from the server 51 and is transmitted to the server 51 via a public network. Of course, when the process comprises an encryption algorithm, further encryption is obviated but may still be performed.

When the server 51 receives the encrypted processed information, the server 51 deciphers the information using a private-key associated with the public-key provided. The processed information is then accessible to the server 51. In this fashion, a security process for securing information to be transferred is dynamically modifiable; the modifiable process reduces chances for breaches of security. Further, advances in security of transmissions are readily implemented in the server 51 by modifying the method employed for process preparation. Client computers 52 accessing the server 51, benefit from the implemented enhancements. Also, at intervals a process may be modified to reduce likelihood of breaches occurring and to prevent ongoing security breaches from continuing.

Transmitting biometric information poses a different set of problems from regular network data transmissions. The amount of information contained within a biometric sample in the form of a fingerprint, a voiceprint, a retinal scan, a palm print, or any other biometric sample is generally quite large. Processing of the information contained in the biometric sample is often accomplished first by characterising the information to extract features or other indicia, and then by comparing the features or indicia to known features or indicia of stored template biometric information thereby attempting to identify a provider of the biometric information. The stored template biometric information is often stored during an enrolment process.

Different methods of verifying biometric information rely on different indicia. Further, some methods rely on different indicia in dependence upon a characterisation of the biometric information. Often, templates are stored as both digitised biometric data and characterised equivalents of same. Fingerprint characterisation is well known and can involve many aspects of fingerprint analysis. The analysis of fingerprints is discussed in the following references which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986

C. B. Shelman, "Fingerprint Classification—Theory and Application," Proc. 76 Carnahan Conference on Electronic Crime Countermeasures, 1976.

Feri Pernus, Stanko Kovacic, and Ludvik Gyergyek, "Minutaie Based Fingerprint Registration," IEEE Pattern Recognition, pp 1380, 1980.

J. A. Ratkovic, F. W. Blackwell, and H. H. Bailey, "Concepts for a Next Generation Automated Fingerprint System," Proc. 78 Carnahan Conference on Electronic Crime Countermeasures, 1978.

K. Millard, "An approach to the Automatic Retrieval of Latent Fingerprints," Proc. 75 Carnahan Conference on Electronic Crime Countermeasures, 1975.

Moayer and K. S. Fu, "A Syntactic Approach to Fingerprint Pattern Recognition," Memo Np. 73-18, Purdue University, School of Electrical Engineering, 1973.

Wegstein, *An Automated Fingerprint Identification System*, NBS special publication, U.S. Department of Commerce/ National Bureau of Standards, ISSN 0083-1883; no. 500-89, 1982.

Moenssens, Andre A., *Fingerprint Techniques*, Chilton Book Co., 1971.

Wegstein and J. F. Rafferty, *The LX39 Latent Fingerprint Matcher*, NBS special publication, U.S. Department of Commerce/National Bureau of Standards; no. 500-36, 1978.

In the verification of a user of the client computer 52 by a process in execution on the server 51, and based on biometric information provided by the user, either the client computer 52 characterises the biometric information and transmits to the server 51 a result of the characterisation, or the client computer 52 transmits to the server 51 a digitised sample of biometric information provided. Alternatively, a hybrid of both scenarios is used. The former method requires that each client/server pair have an identical characterisation process; the latter requires a large amount of bandwidth. For example, a fingerprint imaged using a capacitive fingerprint scanner may be represented by 400×600 individual values or pixels resulting in a total of 240,000 values. When a values is has 8 bits, 240,000 bytes is required. Often an instance of biometric information presented to a biometric input apparatus is not well suited to user identification and a user is required to enter further samples of biometric information for identification to occur. It will be clear to those of skill in the art of computer networking that further instances of biometric information transmitted via a network increase bandwidth requirements.

A further disadvantage of both the former and the latter approach to user identification in dependence upon biometric information is a risk of record/play back. When an entire biometric sample is transmitted, it is capable of being recorded and potentially deciphered for play back from other client computers. When a known characterisation of biometric information is performed by the client computer, deciphering of the characterised data may also lead to a security breach. It is evident to those of skill in the art that when deciphering of an entire instance of biometric information occurs, characterisation of the deciphered biometric information can be performed; because of this, it is undesirable to transmit an entire instance of biometric information across a public or wireless network. Throughout the specification and the claims that follow, the term biometric information sample refers to an instance of biometric information.

Figure 5:
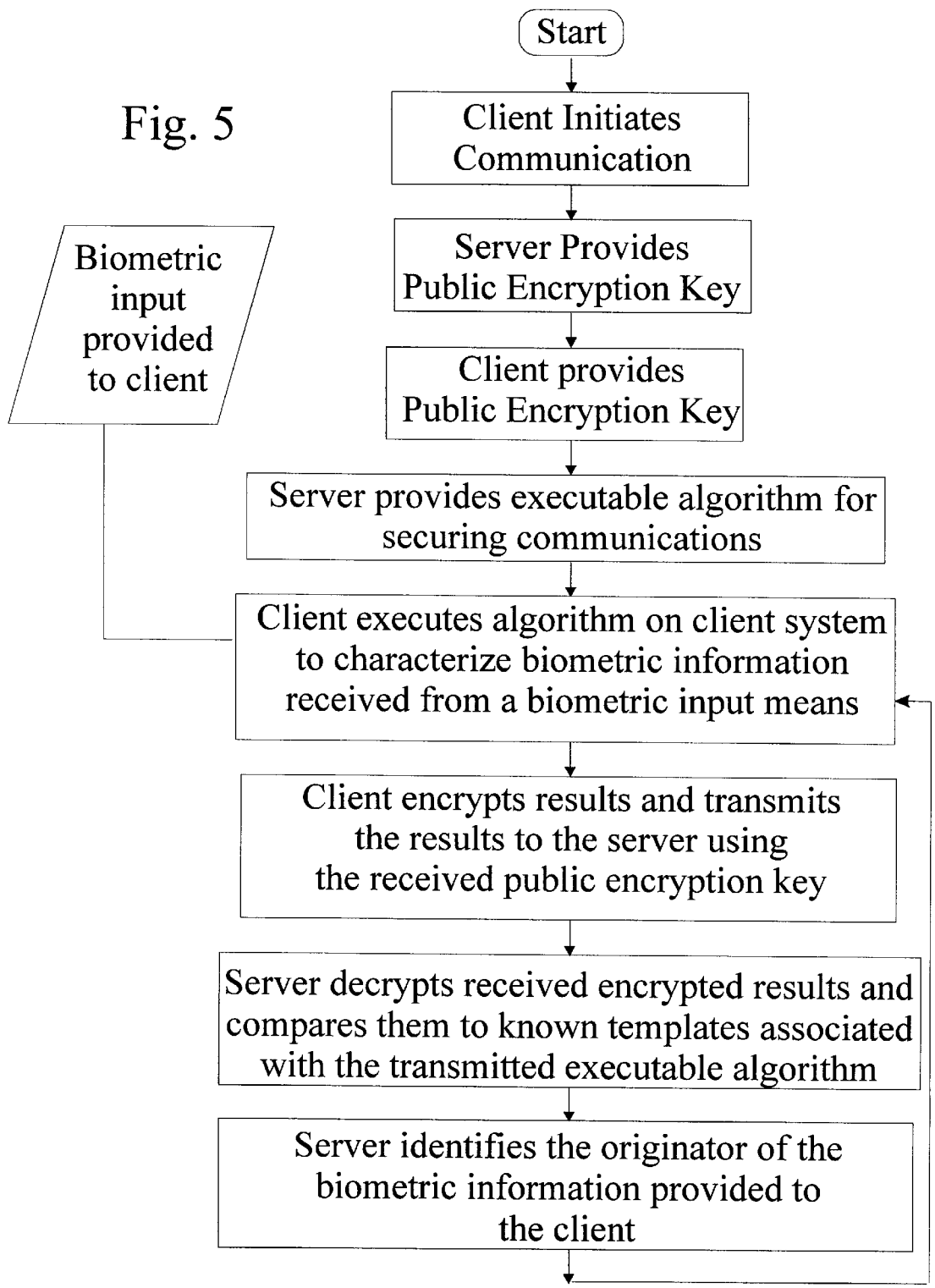
FIG. 5 is a flow diagram of a method of providing computer security using biometric information and according to the present invention.

Referring to FIG. 5, a flow diagram of a method according to the present invention for transmitting biometric information in a secure fashion is shown. The client computer 52 initiates communications with the server 51. The server 51 and the client computer 52 exchange public-keys according to the prior art. The second public-key transferred may be encrypted using the first public-key but this is not necessary. The server 51 prepares a characterisation process for transmission to the client computer 52. The preparation comprises selecting a characterisation process, formatting the process for implementation on the client computer 52 when necessary, and encrypting the resulting data representative of said prepared process. Alternatively, the preparation process comprises selecting an appropriate process for the client computer 52 and for the biometric information being characterised. The prepared process is then transmitted from the server 51 to the client computer 52 where it is received and deciphered. The client computer 52 uses the prepared process to characterise biometric information received from an individual, encrypts the characterised biometric information using the public-key received from the server 51 and transmits the encrypted characterised biometric information to the server 51 via the public network. Alternatively, the process comprises a process for encrypting the characterised data and, therefore, further encryption is obviated. Of course, further encryption may still be used.

When the server 51 receives the encrypted characterised biometric information, the server 51 deciphers the information using a private-key associated with the public-key provided. The characterised biometric information is then compared against templates of characterised biometric information to determine an identification for the user of the client computer 52. When a substantial match occurs between a template and the characterised biometric information, the user is identified. When no match occurs, the server 51 requests a further instance of encrypted characterised biometric information from the client computer 52. In turn, the process in execution on the client computer 52 prompts the user for a further instance of biometric information. Alternatively, the server 51 transmits a second other characterisation process to the client computer 52, and the biometric information is re-characterised according to the second other process received from the server 51. Further alternatively, a further biometric information sample is provided to the client computer 52 and transmitted to the server computer 51; the further sample may have been captured along with the previous biometric information sample, or the further sample may be captured anew when a biometric input means 80 (shown in FIG. 3) allowing for periodic or constant monitoring of biometric information in the form of a mouse provided with a biometric input means 80 is used.

In an alternative embodiment, the encrypted characterised biometric information is compared against an encrypted template. This provides enhanced security for a variety of reasons. First, the actual templates need not be stored on the server 51 thereby preventing unauthorised access thereto. Second, a destructive encryption algorithm may be employed preventing decryption of the data. Destructive encryption algorithms are known in the art of computer security and are often used prior to storing or verifying user passwords.

It will be understood by those of skill in the art that biometric information characterisation is a lossy process so record playback attacks on security are difficult when different characterisation processes are employed even when encryption security is breached. Since different characterisations result in different information extracted from the biometric information, unless two characterisation processes rely upon identical information, insufficient information is present in a single recorded characterisation to properly breach security of another characterisation.

According to an embodiment of the invention, a method which relies on the cross platform compatibility built into the JAVA programming language is shown. An Internet server 51 is provided with a plurality of security processes (or characterisation processes for use with biometric identification systems) implemented using the JAVA programming language. A client computer 52 provided with a JAVA interpreter is capable of executing the security processes. Once public-keys have been exchanged, the server 51 transmits an encrypted security process implemented in the JAVA programming language to the client computer 52 where it is deciphered and executed. Once the process has executed, the resulting secured data is encrypted and transmitted to the server 51. Of course when the security process includes encryption and transmission therein, further encryption and transmission is obviated. The security process is changed for each client connection. Alternatively, the security process is changed for each transmission. Alternatively, the security process is determined randomly. Further alternatively, the security process is changed at intervals.

A pseudo-code listing of a JAVA applet for performing biometric characterisation according to the invention is presented below.

```
import java.io.*;
import java.net.*;
public class SendData
{
  /**
   * First command line argument = file name read data from
   * Second command line argument = server to send data to
   */
  public static void main( String args[] )
  {
    DataInputStream inStream;
    DataOuputStream outStream;
    Socket toSendTo = new Socket( args[1], 3001 );
    byte fromFile[] = new byte[ 1024 ], toSend[];
    int bytesRead = 0;
    inStream = new DataInputStream( new FileInputStream(
        new File( args[0])));
    outStream = new DataOuputStream( toSendTo.getOutputStream() );
    while( true)
    {
      // Read from the local file.
      //
      bytesRead = inStream.read( fromFile, 0, 1024 );
      if( bytesRead < 0 )break;
      // Characterise it.
      //
      toSend = characterise( fromFile, bytesRead );
      // Send it over to the server.
      //
      outStream.write( toSend, toSend.length );
    }
    //Cleanup.
    //
    inStream.close();
    toSendTo.close();
  }
  public byte[] characterise( byte toCharacterise[], int numBytes )
  {
  /*
  Characterisation subroutine goes here
  */
  }
}
```

The subroutine characterise is different for each different characterisation process and the remainder of the script is unchanged. Alternatively, the entire script is different each time. Characterisation processes for biometric information are known in the art and any such process may be employed with the present invention. Preferably, the characterisation processes employed reduce the information transmitted to the server to a subset of the biometric information or to a subset of information obtained from the biometric information.

The server is provided with a corresponding process. An example of a JAVA pseudo-code shell for supporting the corresponding process is as follows:

```
import java.io.*;
import java.net.*;
public class ReceiveData
{
  public static void main( String args[] )
  {
    // Create a server to listen on port 3001
    //
    ServerSocket server = new ServerSocket( 3001 );
    // Wait for a connection to happen. This should be in a loop...
    //
    Socket accept = server.accept();
    DataInputStream inStream = new DataInputStream
    ( accept.getInputStream() );
    DataOutputStream outStream = new DataOutputStream(
```

-continued

```
        new FileOutputStream( new File( "xmit.dat" )));
    byte fromStream[] = new byte[ 1024 ], toWrite[];
    int bytesRead = 0;
    while( true )
    {
      // Receive data.
      //
      bytesRead = inStream.read( fromStream, 0, 1024 );
      if( bytesRead < 0 ) break;
      // Verify the received data.
      //
      toWrite = verify( fromStream, bytesRead );
      // Save it.
      //
      outStream.write( toWrite, toWrite.length);
    }
    outStream.close();
    accept.close();
  }
  public byte[] verify( byte toDecompress[], int numBytes )
  {
  /*
  Verification code goes here
  for selecting verification process and for executing same
  */
  }
}
```

It will be apparent to those of skill in the art, that a single verification subroutine is employed wherein each process transmitted to a client is known and the server provides this additional information to the verification routine for selecting a process therein to execute. In this fashion, a single compiled executable on a server, supports each different characterisation process for provision to clients. Alternatively, different processes are installed using, for example, pointers in dependence upon the process transmitted to the client system.

In the above client pseudo code, connection to a server is established. The server is already be running and listening on port 3001 for connections. The client then enters a loop to read in data from a file, characterise it, and transmit the characterised data to the server. The server, on the other hand, merely reads in data from a socket connection it is monitoring, verifies the data, and then writes the data to a log file.

Figure 6:
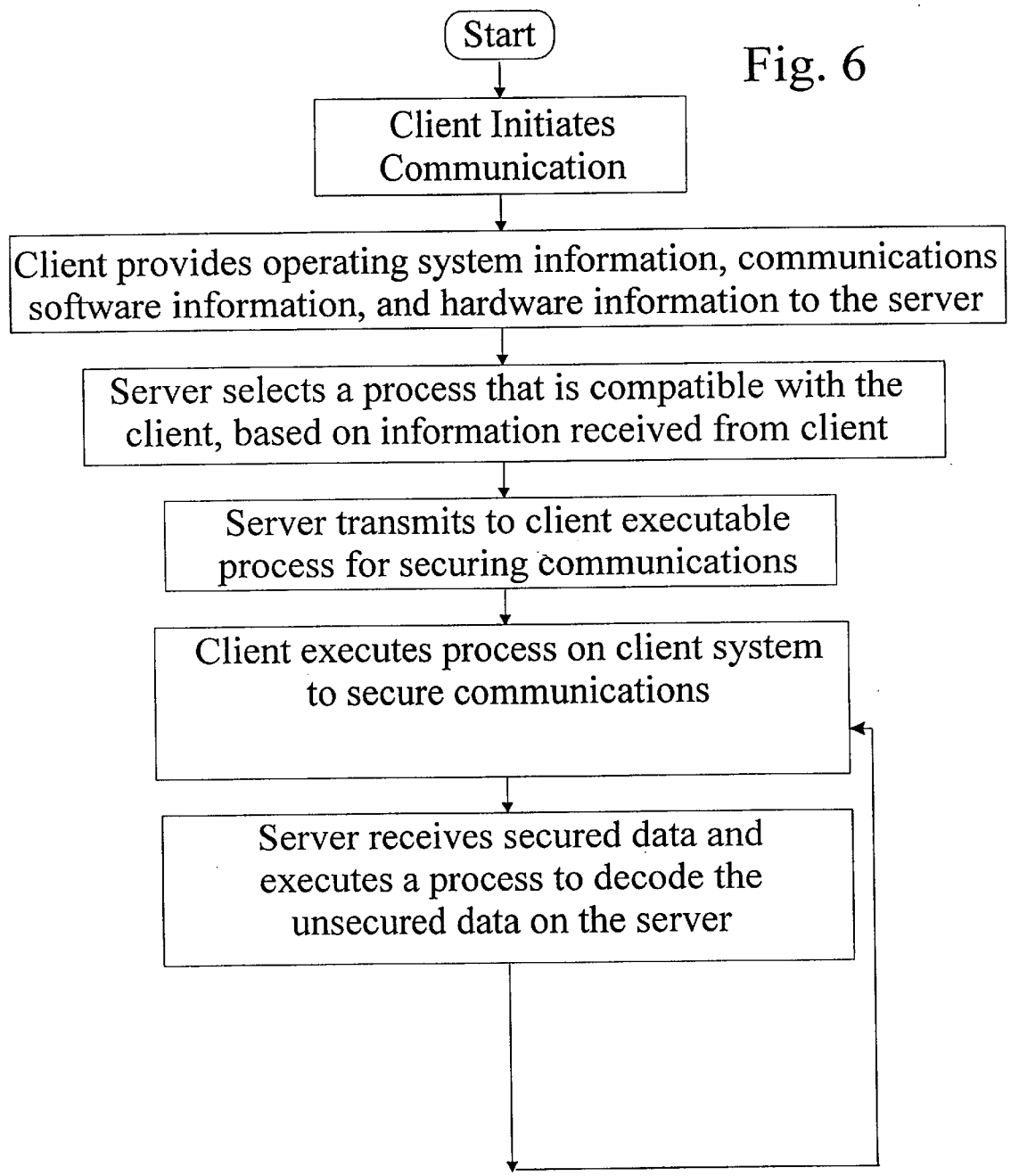
FIG. 6 is a flow diagram of a method of providing computer security using biometric information and according to the present invention.

Another implementation of the method of the present invention is shown in FIG. 6. Along with the exchange of public-keys, a client computer 52 provides information regarding the client computer operating system, communication software, and hardware platform. The server 51 is provided with a plurality of security processes in the form of characterisation processes for use with biometric identification systems each implemented for a platform, operating system, and communication software from a plurality of platforms, operating systems, and communication software packages. The server 51 selects an implementation of a security process from those compatible with the client computer 52 and transmits same to the client computer 52. The client computer 52, provided with a security process, is capable of executing same. Once public-keys and other information have been exchanged according to the present invention, the server 51 transmits the selected security process in an encrypted form to the client computer 52 where it is deciphered and executed. Once the process has executed, the resulting secured data is encrypted and transmitted to the server 51. Of course, when the process includes steps of encryption and/or transmission, these steps are obviated once the process is completed. The security process is changed for each client connection. Alternatively, the security process is changed for each transmission. Further alternatively, the security process is changed at intervals. Optionally, encryption is not used.

Exemplary processes for use with the present invention are described with respect to finger print registration. The method of this invention is applicable to other biometric verification processes and other security processes as is evident to those of skill in the art.

One of the problems with a finger print biometric is that a segment of the population can have temporary or permanent skin conditions which cause poor image quality on the scanning device which in turn causes them to experience high false rejection rates. On-site, temporary problems are resolved through manual user identification or temporary security override by security personnel; however, in remote access systems where an individual is working from home or from a remote location, it is very important that a temporary problem does not occur.

Similarly, it is noteworthy that some remote locations are more secure than others. A dial up connection from another secure location or from an employee's home is likely more secure than a connection from a public location such as a university computer system or another network computer. Establishing different levels of security for different types of system access is advantageous. However, commonly a more remote system requires more security while rendering manual identification difficult.

By allowing candidates to use more than one finger during authentication, lower thresholds for authentication are combined in a way which confirms identities yet does not compromise the level of false acceptances for the system. Thresholds from a set of distinct finger prints from a candidate that would usually be rejected for being too insecure are combined following a process for use with the invention to allow acceptance in dependence upon a plurality of biometric information samples. Thus a candidate lowers the chance of being falsely rejected by supplying multiple biometric information samples in the form of fingerprints for authentication.

Figure 7A:
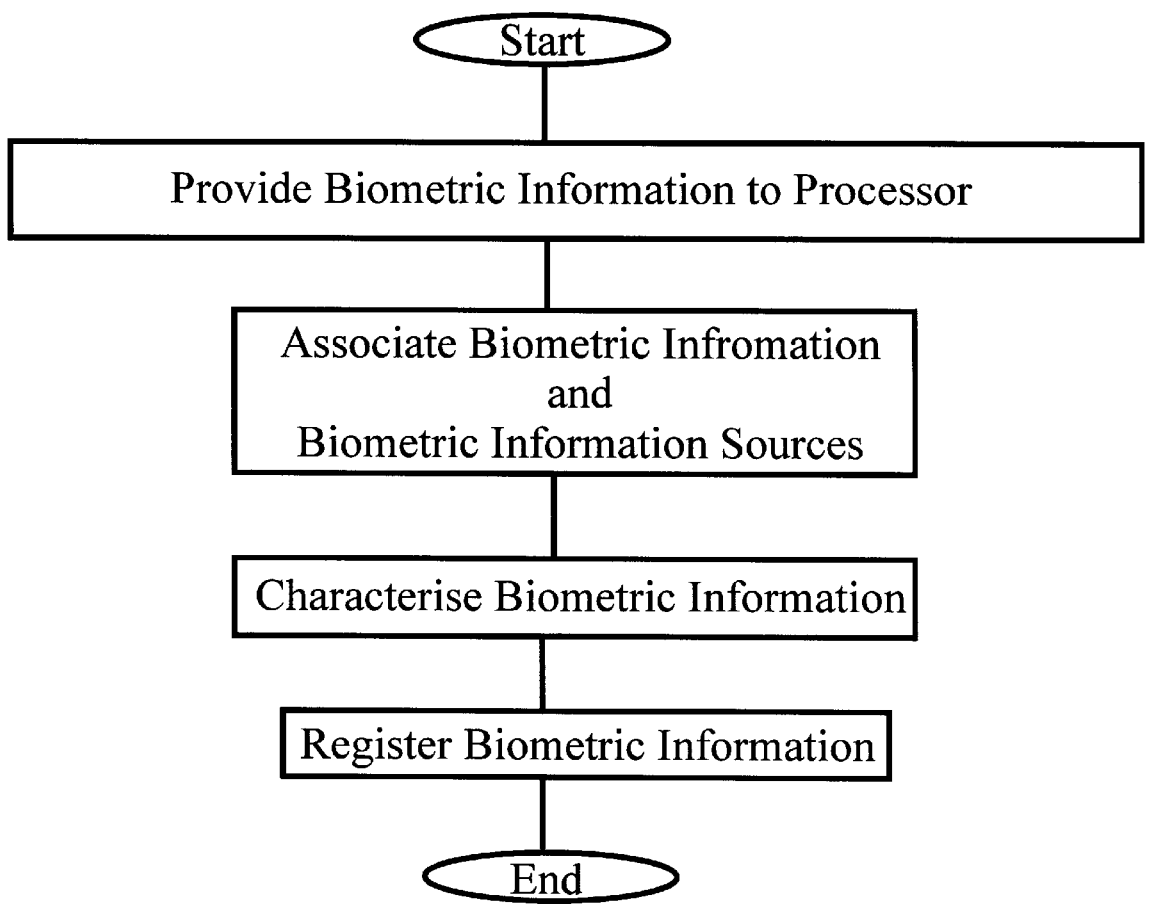
FIG. 7a is a flow diagram of a method of providing biometric information according to the invention.

Referring to FIG. 7a, a flow diagram of a process for use with the invention is shown. The process when executing accepts biometric information samples in the form of fingerprints provided to a client computer in the form of a second other computer. According to the process of FIG. 7a, a plurality of samples from at least two biometric information sources are provided. These samples are in the form of fingerprints, palm prints, voice samples, retinal scans, or other biometric information samples.

Requiring an individual to enter biometric information samples from at least two biometric information sources, allows for improved registration results and reduced false acceptance. For example, some individuals are known to be commonly falsely accepted or identified. The false acceptance often is a result of similarities between biometric information samples from a biometric information source of a registered individual and from a biometric information source of another individual. These similarities are often only present for a specific similar biometric information source such as a left index finger or a right thumb. The provision and registration of two biometric information samples, reduces likelihood of similarity because, where before similarity of a single biometric information source resulted in false acceptance, now similarity in two different sources is unlikely. Therefore, requiring a minimum of two biometric information sources reduces any likelihood of false acceptance. The use of a plurality of varied biometric information sources in the form of retinal scans, voice prints, finger prints, palm prints, toe prints, etc. further reduces probability of false registration; it is unlikely that the varied biometric information from two individuals is similar.

Similarly, requiring an individual to enter biometric information samples from at least two biometric information sources reduces the probability of false rejection. As the likelihood of false acceptance decreases, a lower threshold for acceptance becomes acceptable. Both false rejection and false acceptance are reduced.

Each biometric information sample is associated with a biometric information source in the form of a fingertip, a retina, a voice, a palm, etc. The association, allows for comparison between the biometric information sample and a template associated with the biometric information source. The biometric information samples are each characterised prior to transmission to the server in the form of a first computer. The characterisation is performed according to the process provided to the client computer. Optionally, the characterised information is encrypted prior to transmission.

When an individual's identity is provided to the client computer 52 and transmitted to the server 51, the characterised biometric information sample is only compared to a single template associated with the biometric information source. Alternatively, the characterised biometric information sample is compared against a plurality of templates. Comparing characterisations of biometric information samples is often referred to as registering the biometric information samples. Many methods are known for performing the registration to determine a registration value. The registration value is then used to determine identification; to provide access to a system or structure; to log access; to monitor use; for billing; or for other purposes.

When an individual's alleged identity is not provided to the client computer or known to the server, the characterised biometric information is registered against templates stored in a database of templates in order to locate those registrations which are indicative of a predetermined characteristic. The characteristic is often identity. Because characterisations of a plurality of biometric information samples are provided, the registration against templates is for locating a plurality of templates which are indicative of a predetermined characteristic. When the characteristic is identity, the templates are from a same individual and the registration process tries to locate a set of templates that registers with the characterised biometric information samples resulting in a set of values indicative of accurate identification.

Once accurate user identification has resulted, the server 51 uses the identification for further transactions. Some examples of transactions where user identity is important include access to secure systems, access to data, charging purchases or access time, write privileges on the server 51, logging use, and logging operations.

Figure 7B:
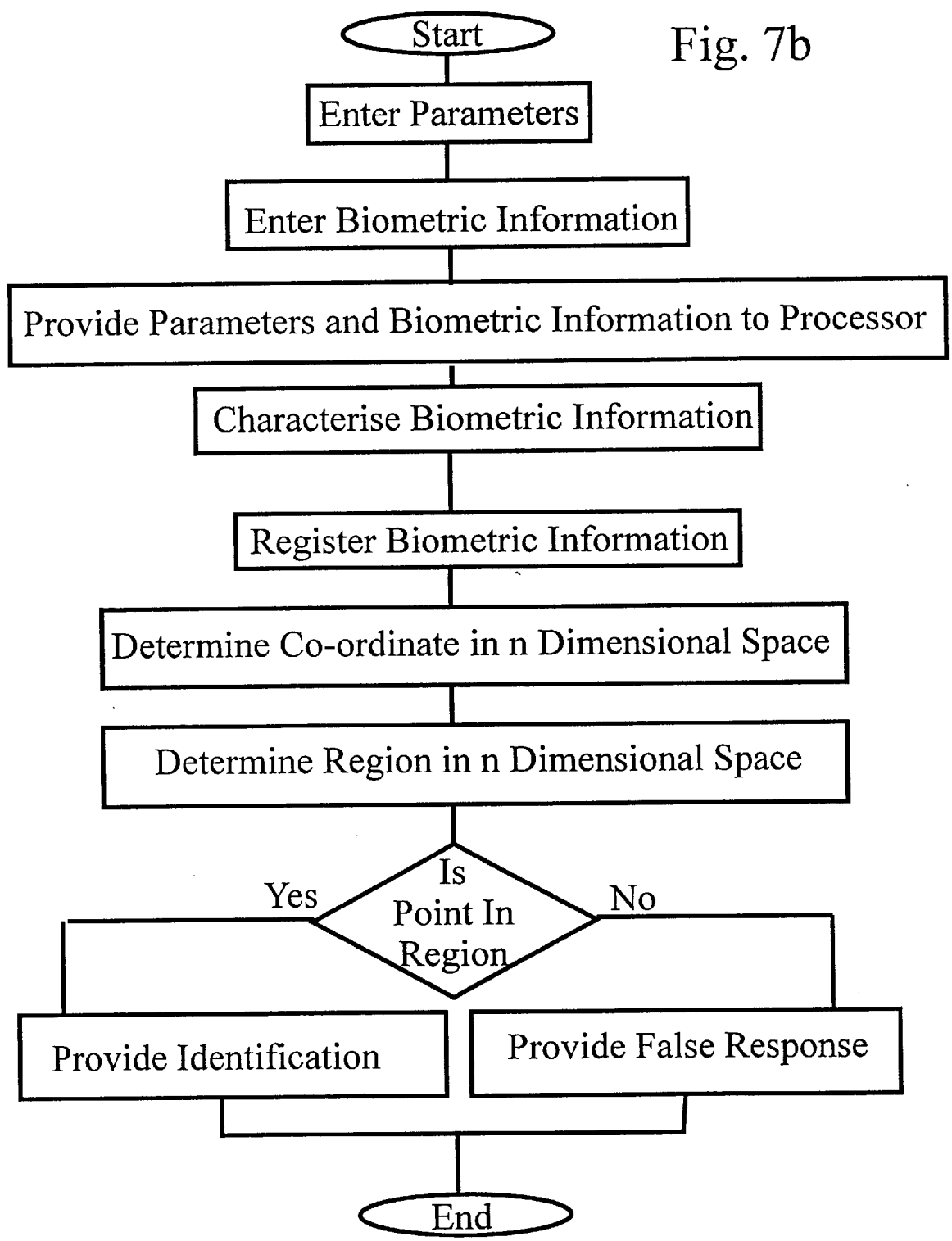
FIG. 7b is a flow diagram of a method of providing biometric information and identifying a user in dependence thereon according to the invention.

Referring to FIG. 7b, a flow diagram of another embodiment of a process for use with the invention for identifying an individual is shown. An individual seeking authentication by a user authorisation system is presented with a parameter entry means in the form of software for execution on the client computer and for providing an individual with means for selecting or customising parameters. Some known means include prompts, a command line, or a graphical user interface, voice recognition software, magnetic strip readers, card readers, and wireless communication means.

Figure 8:
FIG. 8 is a simplified diagram of a user interface for entering parameters according to the invention.

Using the parameter entry means, the individual determines biometric information sample parameters. The parameters are selected from a known group of available parameters. Examples of known groups of biometric information samples include (right index finger, left index finger, left thumb); (right index finger, voice); (retinal scan, voice); (left thumb, left middle finger); etc. Groupings reduce user entry requirements; however, groupings also reduce flexibility. Alternatively, parameters are entered by an individual selecting from all available parameters in order to determine a group. For example, an individual is presented with a graphical display, as shown in FIG. 8, of biometric information sources in the form of fingers 11 and selects a number of samples for each source. When a voice recognition system is incorporated into the user authorisation system, an icon 12 representing voice is also displayed. When a retinal scanning system is incorporated, an icon 13 representing the retinal scan is displayed. Other icons are displayed when corresponding biometric identification systems are present. The individual enters parameters in the form of identifying biometric information sources and for each source a quantity of samples being provided.

Preferably a minimum set of requirements exist which, though flexible, ensures sufficient levels of security. Requiring each individual to enter information from a minimum number of biometric information sources and perhaps a maximum number of samples from a same biometric information source, allows for maintenance of at least a predetermined security level. Of course, when used according to the present invention, the minimum set of requirements is determined by the process while executing on a client computer based on available biometric input devices. Alternatively, the client computer 52 transmits information concerning available biometric input devices to the server and the server 51 determines a minimum set of requirements. In this latter case, the location of the client—in a secure environment, in a university computer lab, mobile computer, etc.—is also a factor to consider.

Once the parameters have been entered, the individual enters biometric information in the form of fingerprints into the system in accordance with the parameters. Preferably, the parameters once selected are analysed and the individual is prompted to enter each biometric information sample. Alternatively, the parameters and the biometric information in the form of representations of fingerprints are provided simultaneously.

Figure 8A:
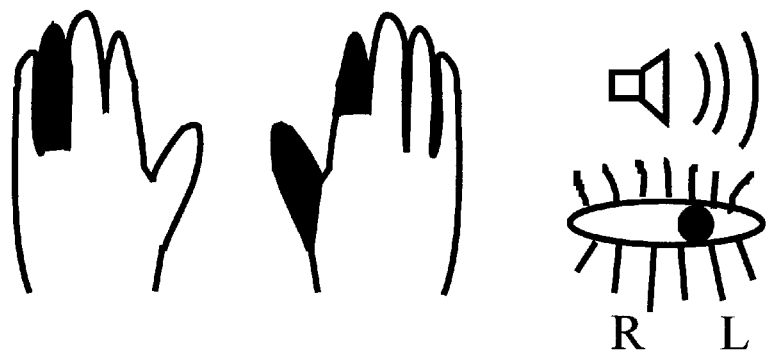
FIG. 8a is a simplified diagram of FIG. 8 with some parameters selected for entry.

The biometric information provided by the individual is related to the parameters selected. For example, referring to FIG. 8a, when the individual selects left ring finger once, right thumb once, and right index finger once, the individual then provides a sample of a fingerprint from the left ring finger, a fingerprint sample from the right thumb and a fingerprint sample from the right index finger. Prompting, shown in FIG. 8b, allows the individual to select very complicated sets of biometric information sources or to select from predetermined sets without remembering the parameters and/or an order for the parameters. Alternatively, prompting is performed by flashing selected biometric information sources in a graphical user interface as shown in FIG. 8a or in another fashion.

A biometric input means 80 in the form of a live fingerprint scanning device is used to collect the biometric information in the form of images of fingerprints of the individual which are entered in a predetermined order. Each biometric information sample is identified with its known source. When the individual is prompted for a biometric information sample, the client computer associates the samples with labels. Alternatively, an individual enters parameters and biometric information simultaneously by entering a biometric information sample and identifying the sample as, for example, a specific fingerprint or a voice sample. Optionally, the individual is provided with a means of reviewing and accepting or discarding biometric information samples.

Each biometric information sample is characterised according to the process provided from the server 51 to the client computer 52. The characterised biometric information is then transmitted to the server 51 for authentication.

The authentication procedure determines an independent sequence of comparison scores from the input provided by the candidate. This sequence is considered to be a point, hereinafter referred to as P, in n-dimensional vector space, $R^n$. A threshold function $h_\alpha: R^n \to R$ is used to determine whether or not the point belongs to a set $U_\alpha$ by $P \in U_\alpha \Leftrightarrow h_\alpha(P) \geq C_\alpha$. The identity of the individual is confirmed if and only if $P \in U_\alpha$.

The biometric information sample identifiers are used to uniquely identify the characterised biometric samples transmitted to the server 51. Let I be the set of input images, $I = \{I_i | 1 \leq i \leq N\}$. For $I_i \in I$, let $Id_i$ be the identifier of an image, let $T_i$ be the transmitted characterisation or template of the fingerprint image (to the server 51 from the client computer 52), and let $T_i^*$ be the reference template of the image. Define the equivalence relation $\equiv$, on the set I by $$I_i \equiv I_j \Leftrightarrow Id_i = Id_j,$$

The sets $H_k = \{I_i | I_i \equiv I_k\}$ are equivalence classes that partition the set of input images into sets of images that belong to a same finger tip. There are n of these classes where $1 \leq n \leq N$.

When $\tau$ is a set of all fingerprint templates generated by a given characterisation algorithm and score: $\tau \times \tau \to R$ is the measure generated by an associated matching algorithm, then we can construct a set of class representative, $I_R$, which contains one representative for each $H_k$:

$$I_R = \{I_j \in H_k \mid score(T_j, T_j^*) = \max_{I_i \in H_k}\{score(T_i, T_i^*)\}, 1 \leq k \leq N\}$$

The set $I_R \subseteq I$, is then a set of images of the distinct input fingerprints that achieve the highest scores. Alternatively, multiple samples of a same fingerprint are considered.

For each $I_i \in I_R$, $1 \leq i \leq n$, let $x_i = score(T_i, T_i^*)$ correspond to scores from the matching algorithm. Any ordering of these scores is a point in the vector space $R^n$, simply by constructing the n-tuple $(x_1, x_2, \ldots, X_n) = P$.

Essentially, once a set of parameters is selected, a graphical distribution of identifications is achievable in n-dimensions. Referring to FIG. 9, the characterised biometric information samples are provided to the server. Registration is conducted against known templates in dependence upon the parameters selected whether by the server 51, the client computer 52, or the individual. Once registration is complete, a single point is determined having co-ordinates equal to each of at least some of the registration results. Alternatively, the point has co-ordinates determined in dependence upon the registration results but not equal thereto. Plotting the point results in a point plotted in n-dimensional space. The server 51 then determines a probability distribution for the selected parameters. Alternatively, this is performed prior to the registration process for characterised biometric information samples. For example, once a process is transmitted to a client computer 52, the server 51 computes probability distributions. Further, Alternatively the probability distributions are determined or approximated in advance and stored in non-volatile memory.

Given an n-dimensional plot defined by a boundary function and a single point, a comparison determines whether or not the point falls below or above the function and optionally within or outside other known ranges. Stated differently, the point is analysed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified. The identification system then responds accordingly. Responses in the form of locking an individual out, denying an individual access, logging an attempted entry by an unidentified individual, etc. are well known.

Figure 10:
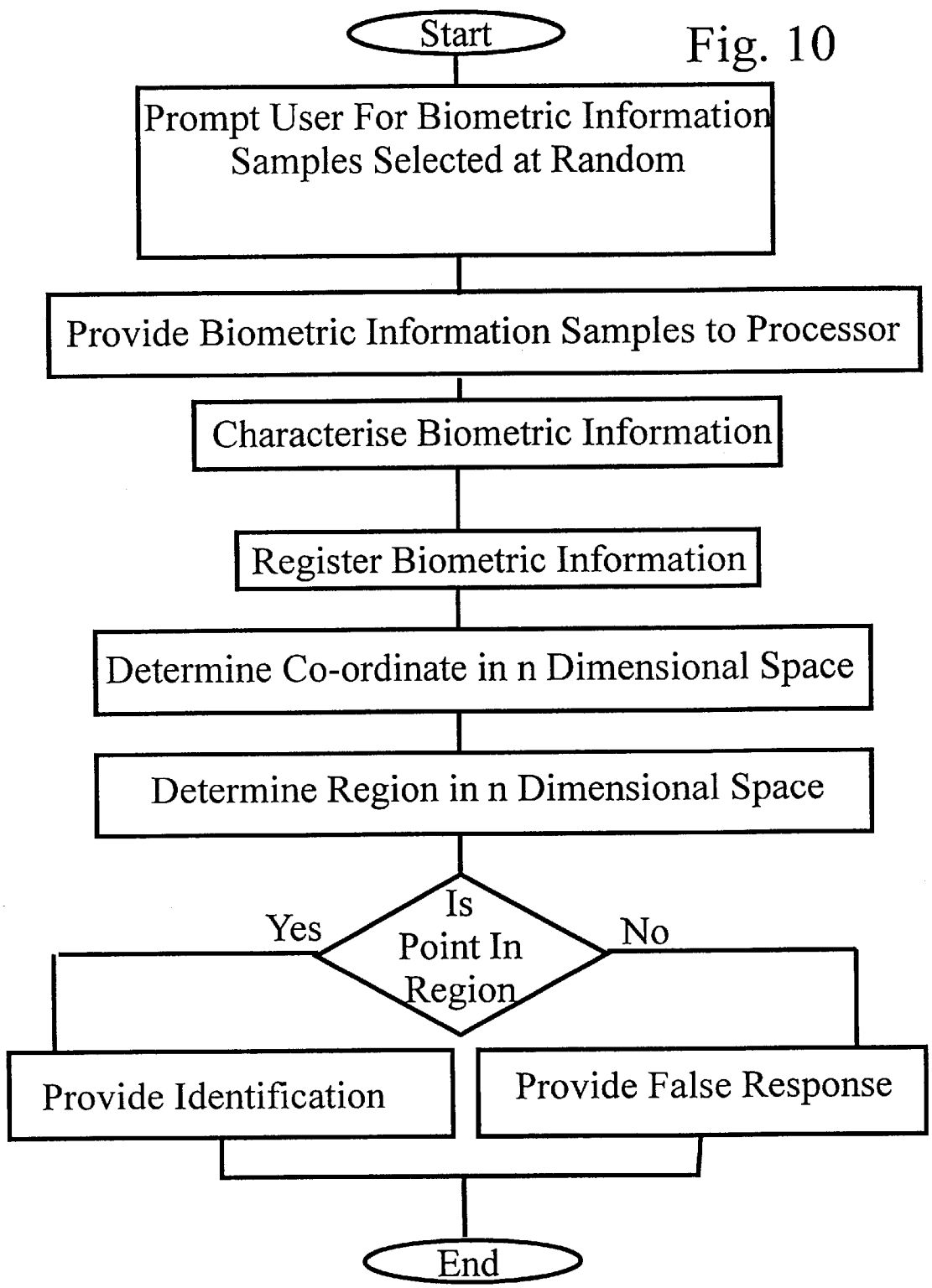
FIG. 10 is a flow diagram of another method of providing biometric information and identifying a user in dependence thereon according to the invention.

Referring to FIG. 10, a simplified flow diagram of another process for use according to the invention is shown. According to the process, biometric information samples are provided to the client computer 52 and associated with their biometric information sources in the form of finger tips, eyes, palm, or voice. The processor 54 of the client computer 52 characterises the biometric information samples according to the received process and transmits the characterised biometric information samples to the server 51. In an alternative embodiment, the client computer 52 communicates with the server 51 and receives characterisation processes in dependence upon the user identity and the entered parameters. Optionally, the characterised information is encrypted prior to transmission to the server 51.

The server receives the characterised biometric information samples and registers them against templates. When the individual's alleged identification is known, registration is performed against templates associated with the individual and associated with same biometric information sources. Identification of an individual is conducted in a fashion similar to that set out for FIG. 7b above.

Figure 11:
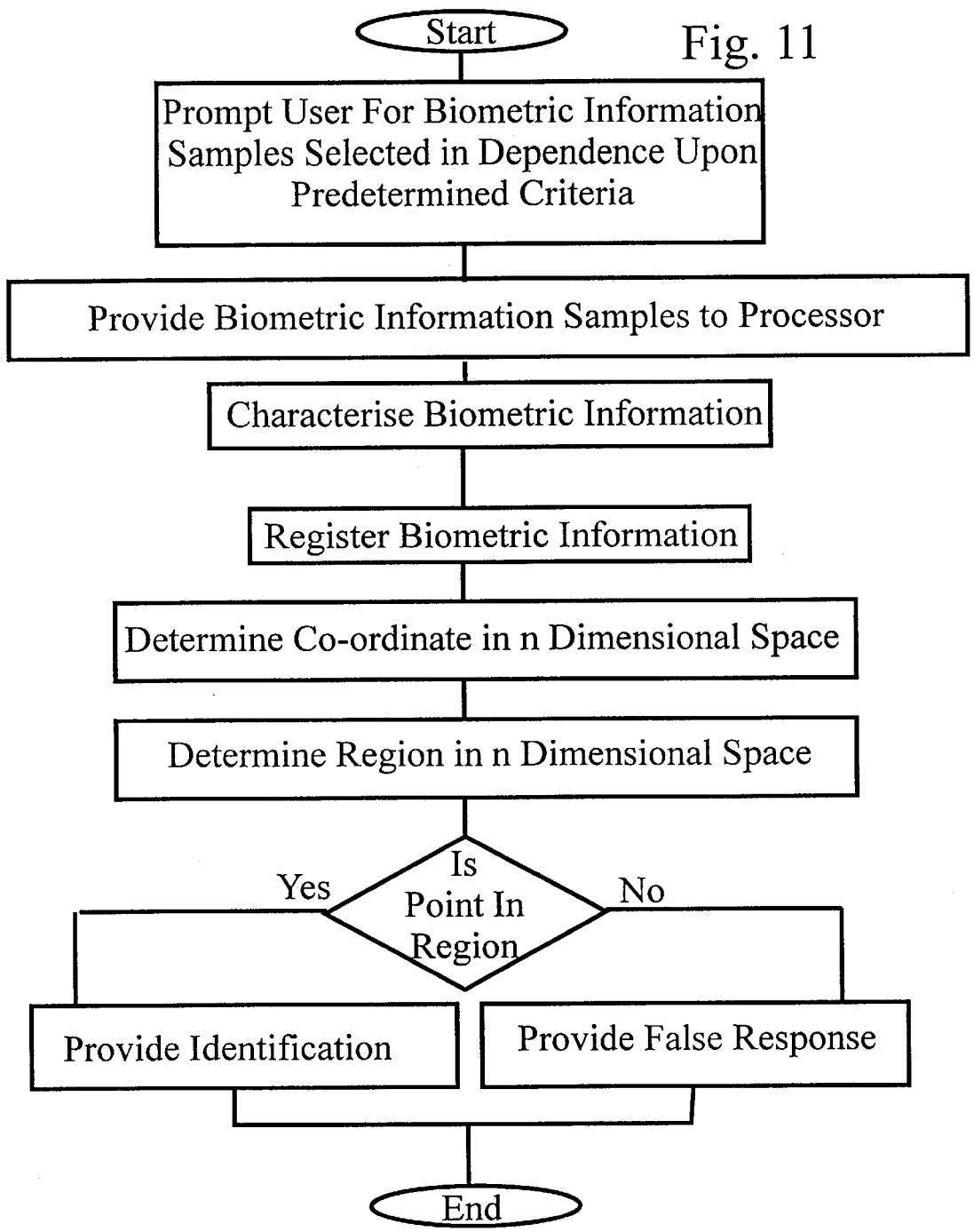
FIG. 11 is a flow diagram of another method of providing biometric information and identifying a user in dependence thereon according to the invention.

Referring to FIG. 11, a simplified flow diagram of another process for use in a method according to the invention is shown. According to a received process, a client computer prompts an individual for biometric information samples associated with biometric information sources selected by the client computer at random. The biometric information samples are provided to the processor. The processor characterises the biometric information samples and transmits the characterisations to the server. The server registers the characterisations against templates. When the individual's alleged identification is known, registration is performed against templates associated with the same biometric information sources of the individual. Identification of an individual is conducted in a fashion similar to that set out for FIG. 7b above.

Figure 12:
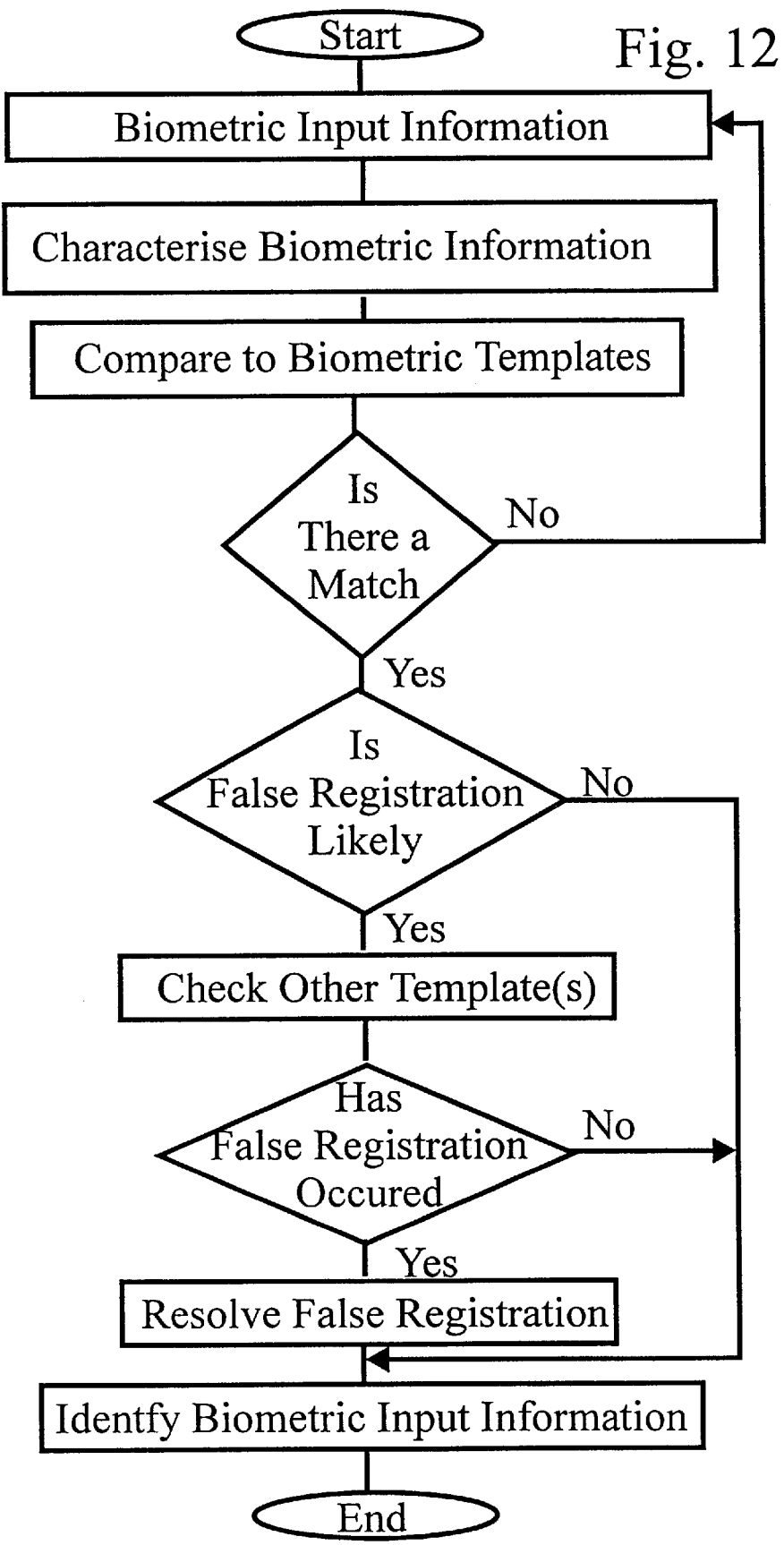
FIG. 12 is a flow diagram of another method of providing biometric information and identifying a user in dependence thereon according to the invention.

Referring to FIG. 12, a simplified flow diagram of another process for use in a method according to the invention is shown. Biometric information samples and associated parameters are provided to the processor 54 of the client computer 52. The processor 54 characterises the biometric information samples and the characterisations are transmitted to the server 51. Optionally, characterisations comprise information relating to biometric information sources. The server receives the characterisations and registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. When the value is within predetermined limits for an acceptable value, identification is provided. When the value falls outside the predetermined limits identification is not provided. Identification is used to provide user access to the server, for user authentication, for billing, or for other purposes where user identification is desirable.

Figure 13:
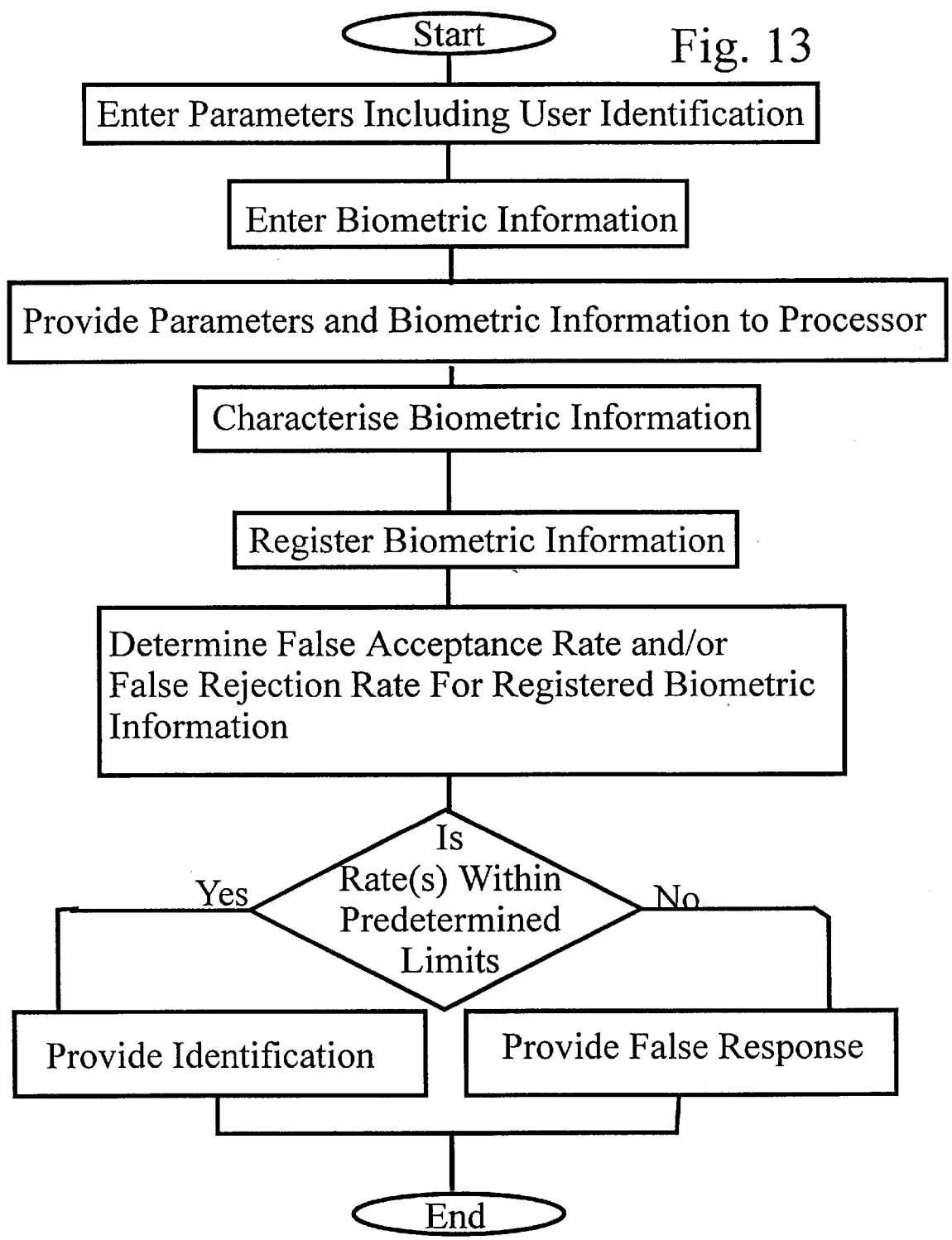
FIG. 13 is a flow diagram of another method of providing biometric information and identifying a user in dependence thereon according to the invention.

Referring to FIG. 13, a simplified flow diagram of another process for use in a method according to the invention is shown. Biometric information samples and associated parameters including an alleged identification of the individual are provided to the processor 54 in the client computer 52. The processor 54 characterises the biometric information samples in accordance with the process received from the server 51 and the characterisations are transmitted to the server 51. The server registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. When the value is within predetermined limits for an acceptable value, identification is provided. When the value falls outside the predetermined limits identification is not provided.

Figure 14:
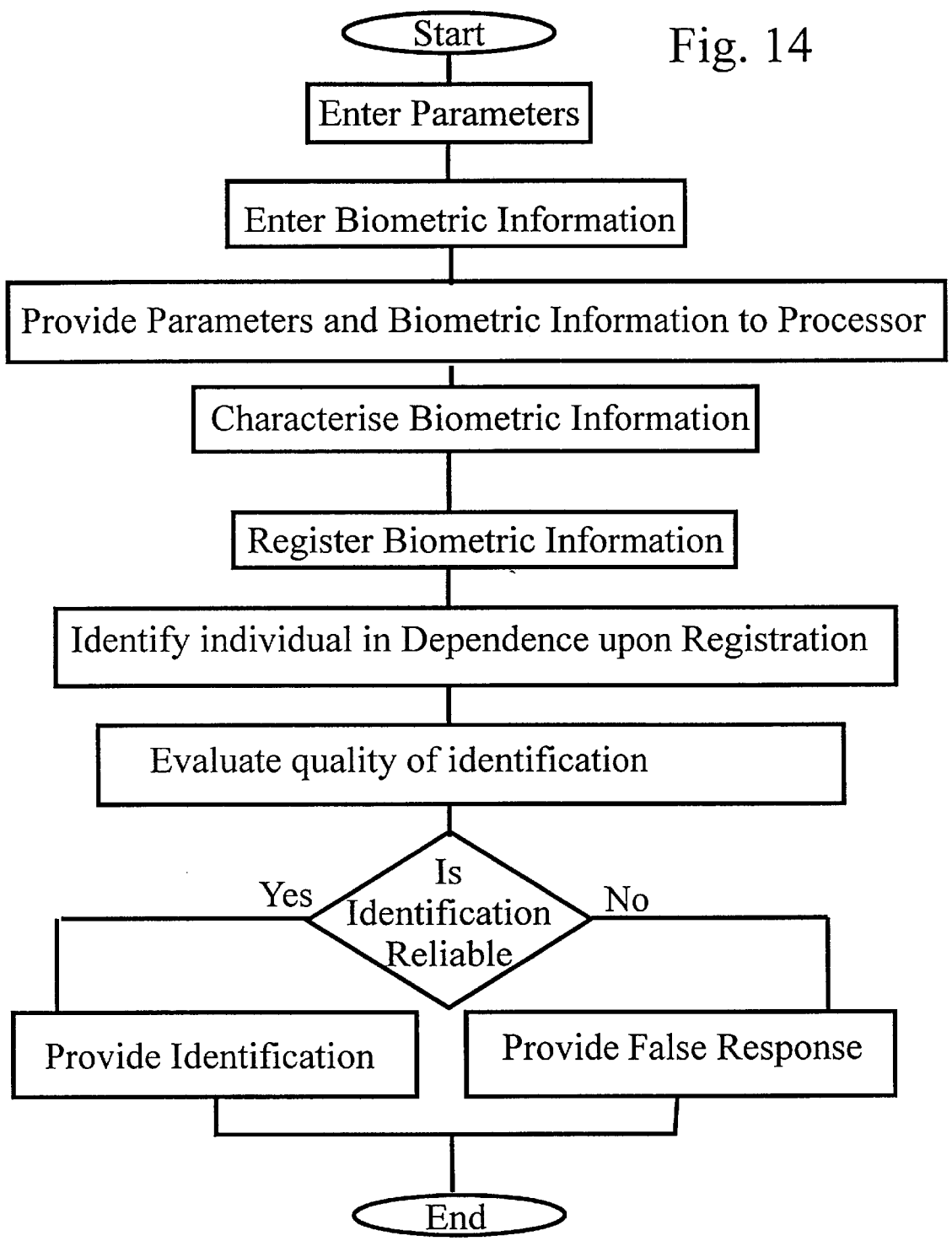
FIG. 14 is a flow diagram of another method of providing biometric information and identifying an individual in dependence thereon according to the invention.

Referring to FIG. 14, a simplified flow diagram of another process for use in a method according to the invention is shown. Biometric information samples and associated parameters are provided to the processor 54 of the client computer 52. The processor 54 characterises the biometric information samples according to a process provided from the server 51 to the client computer 52 and the characterisations are transmitted to the server 51. Preferably, the characterisation process is determined in dependence upon the parameters. Optionally, the characterisations are encrypted. The server receives the characterisations and registers them against templates. When the individual's alleged identification is known, registration is performed against templates associated with the individual and associated with same biometric information sources. Identification of an individual is performed by evaluating resulting values from the registration to determine a quality of user identification. When the quality is within predetermined limits for an acceptable quality, identification is provided. When the value falls outside the predetermined limits identification is not provided.

Figure 15:
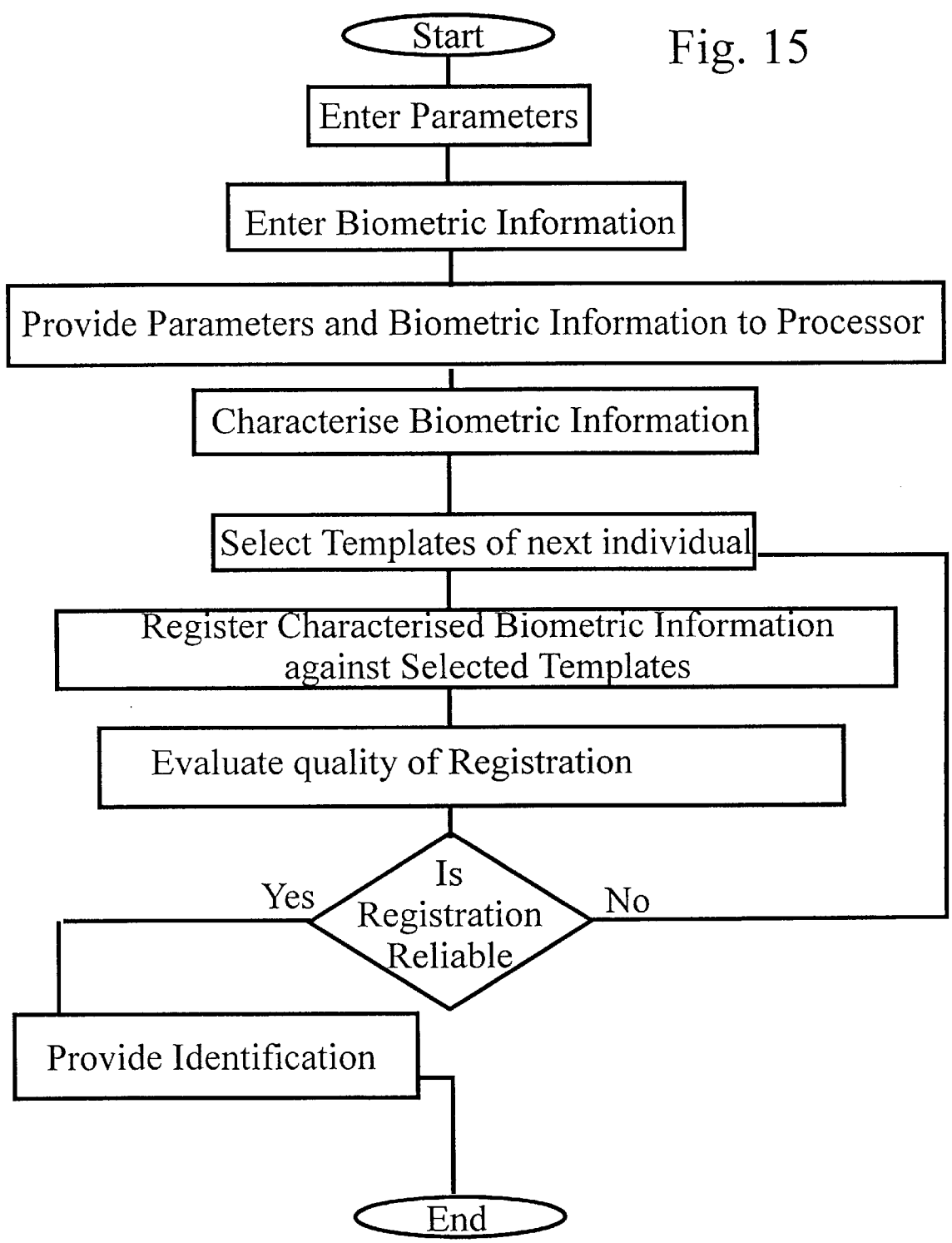
FIG. 15 is a flow diagram of another method of providing biometric information and identifying an individual in dependence thereon according to the invention.

Referring to FIG. 15, a simplified flow diagram of another process for use in a method according to the invention is shown. Biometric information samples from an individual and associated parameters are provided to the processor 54 of the client computer 52. The processor 54 characterises the biometric information samples and the characterisations are transmitted to the server 51. The server 51 registers the characterisation against templates. A first set of templates associated with an individual and associated with same biometric information sources is selected. Registration of the biometric information samples is performed against the selected templates producing registration values. In dependence upon these values a quality of user identification is determined. When the quality is within predetermined limits for an acceptable quality, identification is provided. When the value falls outside the predetermined limits identification is not provided and a next set of templates is selected. A process is determined in dependence upon the next set of templates and the process is transmitted to the client computer for execution thereon. The steps repeat a number of times or until user identification occurs. Optionally, once all sets of templates are exhausted, an indication of failure to identify is provided.

Figure 16:
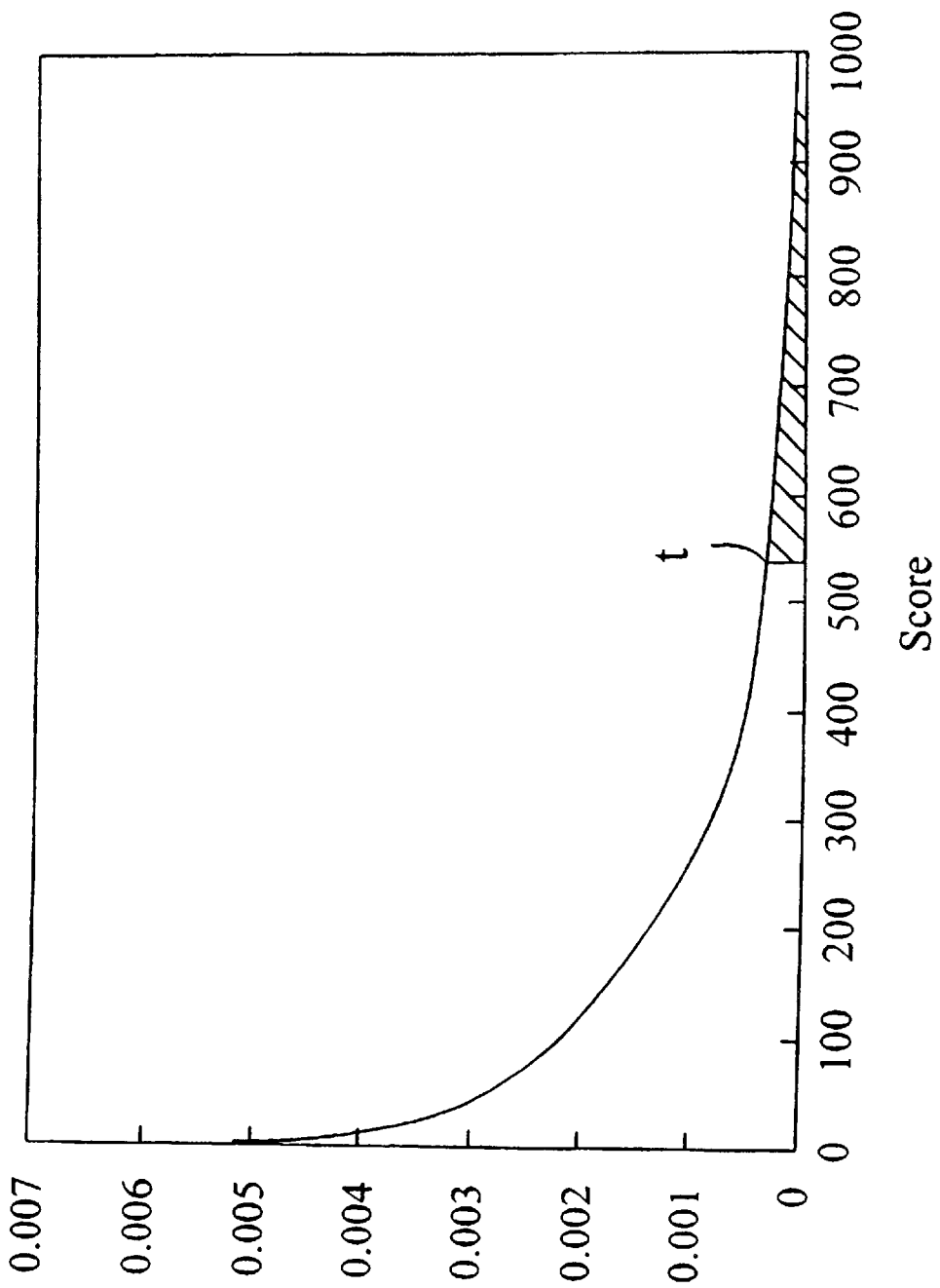
FIG. 16 is a probability distribution curve for individual identification using a biometric information sample.

Referring to FIG. 16, a two dimensional probability distribution is shown. The total area below the distribution curve is 1 unit area. Using such a curve, false acceptance or false registration is described. Most biometric information samples are easily characterised. The high initial point on the probability curve and the steep decent to an asymptotic curve approaching 0 shows this. The line t marks the cutoff for registration effectiveness. This is determined in dependence upon an algorithm chosen and upon system limitations such as processor speed, memory, and security requirements. The shaded region bounded by Y=0, X>t, and the probability curve represents false acceptances.

Figure 17:
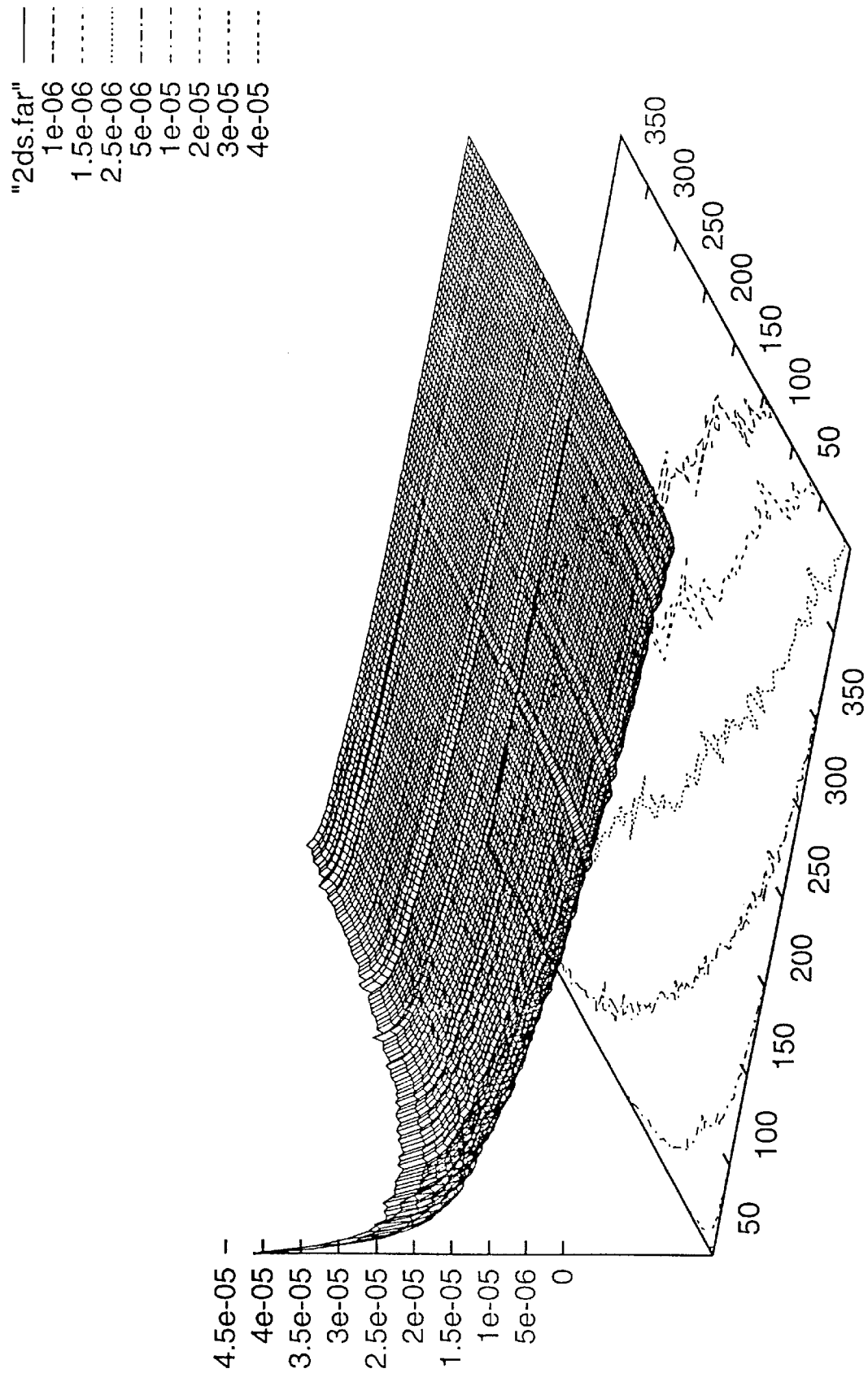
FIG. 17 is a two dimensional probability distribution surface for individual identification in dependence upon a plurality of biometric information samples.

Referring to FIG. 17, a truncated two dimensional probability distribution curve is shown. Now, false acceptance is represented by a region of three dimensional space having a volume of 1 unit$^2$. Upon viewing the graph of actual data for fingerprint biometric information, it is apparent that the graph is symmetrical and that the graph extends toward infinity without reaching the plane z=0. Further, the diagonal centre of the surface x=y is a minimum for a given x and y.

A plot showing an acceptance curve for registration is contained below the curve of FIG. 17. Here two parameters either from separate registrations or from a same biometric information sample registration are evaluated to determine a point. When the point falls below the line, the biometric information is not identified and correspondingly the individual is not identified. Alternatively, when the point falls within the shaded region, registration occurs. Extending this to a plurality of biometric information samples results in regions allowing for excellent registration of some samples, as shown in FIG. 17 at B, with moderate registrations of other samples. Using a plurality of biometric information samples, allows equivalent registration algorithms to provide greatly enhanced security or Alternatively, allows faster and simpler registration algorithms to provide equivalent security.

In evaluating security of biometric authorisation systems, false acceptance and false rejections are evaluated as a fraction of a user population. A security system is characterised as allowing 1 in 1,000 false acceptances or, alternatively, 1 in 1,000,000. Extending the graph of FIG. 17 to n dimensions, results in a different distribution for a region representing acceptance and, therefore, a match scores of a single biometric information sample that falls outside the shaded region of FIG. 17, when combined with several other similarly weak biometric information samples, is more likely to fall within an acceptable region. A reasonable correlation among several identifiers is a good indication of identity. Alternatively, using only a single biometric information sample, a low match score results in failure to authorise an individual. Likewise, a different individual entering a plurality of biometric information samples and trying to gain unauthorised access by, for example, posing as an authorised individual, is unlikely to match evenly across all samples and, whereas a single biometric information sample may match well, several will not. Further examination of an acceptance graph shows that excellent match scores of some samples reduces the necessary match scores for other samples for authorisation to occur.

The probability density function is discussed below. Assume a probability density function, $f$, of non-match scores exists. That is, $f: R \rightarrow [0, 1]$ and $$\int_R f = 1$$

If $S=\{x|x=\text{score}(T_a, T_b)$, where $T_a$ and $T_b$ are characterisations of distinct fingerprints$\}$, then $f$ is 0 outside of S, and $$\int_S f = \int_R f = 1$$

It should be noted that $x \in S \Rightarrow x \geq 0$ since score is a measure. An n-dimensional probability density function, g for a sequence of non-match scores is constructed by:

$$g(P) = \prod_i^n f(x_i), \text{ for } P \in R^n$$

Since each $f(x_i) \geq 0$, then it follows that $g(P) \geq 0$ and that $$\int_R f = 1 \Rightarrow \int_{R^n} g = 1$$

For any subset $U \subseteq Sn$, the probability that a collection of n scores of non-matching fingerprints lies in U is given by:

$$\int_U g$$

Given an n-dimensional probability density function, g, a region, $U\alpha \subseteq Sn$ is defined, bounded "below" by a function, $h\alpha: Rn \rightarrow R$.
$U\alpha=\{P \epsilon Sn | h\alpha(P) \geq C\alpha\}$.
$C\alpha$, a constant, is calculated such that:

$$\int_{U_\alpha} g = \alpha$$

Thus, given a collection of n fingerprint match scores in the form of a point P, we determine when $P \epsilon U_\alpha$ by applying the threshold function $h_\alpha$. Moreover, the probability that such a collection of scores belongs to $U_\alpha$ is $\alpha$ which can be interpreted as a predetermined false acceptance rate. The criteria $h_\alpha(P) \geq C_\alpha$ is used to accept the candidate when true, and reject the candidate otherwise.

Test Case

A large sample consisting of several million non-match comparisons has been generated from a database of fingerprint images in order to create a relative frequency distribution, F(X) of non-matching fingerprint scores. X=score $(T_a, T_b)$, where $T_a, T_b \epsilon \tau$ are templates of different fingerprints. Note that the frequency distribution is a function of a discrete variable. For the purposes of the test case, we assumed that a continuous probability density function, $f(x)$, of non-matching fingerprint comparisons exists, and all derivations are performed for the continuous case. When a calculation was required in dependence upon actual data, $f$ was approximated by F, and integration was replaced by summation.

When we are given a sequence of n non-matching fingerprint scores, $\{x_i\}$, $1 \leq i \leq n$, then an n-dimensional probability density function, g, is derived as follows: Let
$$P=(x_1, x_2, \ldots, x_n)$$
be a particular ordering of the sequence.

Define $$g(P) = \prod_i^n f(x_i);$$

since $$\int_R f = \int_S f = \int_0^\infty f(x)\,dx = 1$$

and $$R^n = R^{n-1} \times R$$

then it follows that $$\int_{R^n} g = \int_{R^n} \prod_i^n f(x_i)\,d\bar{x} = \int_{R^{n-1}} \left( \int_R \left( \prod_i^{n-1} f(x_i) \right) f(x_n)\,dx_n \right) dx^{n-1} =$$

$$\int_{R^{n-1}} \left( \prod_i^{n-1} f(x_i) \int_R f(x_n)\,dx_n \right) dx^{n-1} =$$

$$\int_{R^{n-1}} \left( \prod_i^{n-1} f(x_i) \cdot 1\,dx^{n-1} \right) = \int_{R^{n-1}} \left( \prod_i^{n-1} f(x_i)\,dx^{n-1} \right)$$

Repeatedly applying iterated integrals in such a manner, eventually results in $$\int_{R^n} g = 1$$

When $U \subseteq R^n$, the probability that a collection of n scores of non-matching fingerprints lies in U is calculated by iterated integrals over rectangles in Rn by:

$$\int_u g = \int_R g \cdot \chi u$$

where $U \subseteq R$, and R is a rectangle in $R^n$, and $X\chi$ is the characteristic function of the set U $$\chi u(P) = \begin{cases} 1 & P \in U \\ 0 & P \notin U \end{cases}$$

assuming that $\chi u$ and $f$ are integrable. In the discrete case, we analogously define $$G(P) = \prod_i^n F(x_i)$$

G(P) gives the probability that the n independent scores, $\{x_i\}$ of non-matching finger prints occur in a particular sequence. (Note that g(P) does not give a probability at any specific point since the measure, and hence the integral, over a single point is zero).

For purposes of calculating false acceptance rates in n-dimensions, we must attempt to construct regions in $R^n$ that have desirable properties. Suppose that $\alpha$ and $\beta$ are false acceptance rates. We would like to define regions $U_\alpha$, $U_\beta \subseteq R^n$ such that:

$$\int_{U_\alpha} g = \alpha \quad \text{and} \quad \int_{U_\beta} g = \beta \tag{1}$$

$$U_\alpha = \{P \in S^n \mid h_\alpha(P) \geq C_\alpha\}, \quad U_\beta = \{P \in S^n \mid h_\beta(P) \geq C_\beta\} \tag{2}$$

$$\alpha \leq \beta \Rightarrow U_\alpha \subseteq U_\beta \tag{3}$$

$$h_\alpha(P) = C_\alpha \Rightarrow g(P) \approx K_\alpha, \quad h_\beta(P) = C_\beta \Rightarrow g(P) \approx K_\beta \tag{4}$$

The first condition simply defines a false acceptance rate as a probability. The second condition indicates that regions are bounded below by a threshold function where $C_\alpha$, $C_\beta$ are non-negative constants. The third condition states that when a point is a member of a false acceptance region with a lower probability, it also belongs to a false acceptance region associated with a higher probability. One way to achieve this is to have $h_\alpha = h_\beta$, (i.e. use the same function) and let $C_\beta \leq C_\alpha$. The last condition attempts to ensure that points along or proximate the region boundaries retain substantially level contours on the n-dimensional probability density function. This reduces uneven boundaries "favouring" certain combinations of match scores.

It is worth noting that corresponding n-dimensional false rejection rates are calculated assuming that an analogous n-dimensional probability density function, $g^*$ is constructed from the probability density function of fingerprint match scores. The corresponding false rejection rate for an n-dimensional false rejection rate $_\alpha$ is given by:

$$\int_{S^n - U_\alpha} g^*$$

Alternatively, the method is employed with retinal scanned biometric information. Further Alternatively, the method is employed with palm prints. Further Alternatively, the method is employed with non image biometric data such as voice prints.

One consequence of two different biometric sources is that the above math is complicated significantly. As a false acceptance rate for fingerprints may differ significantly from that of voice recognition devices or retinal scans, a different f(x) arises for the two latter cases resulting in asymmetric regions. For only fingerprint biometric information, ordering of samples is unimportant as false acceptance rates are substantially the same and therefor, the regions defined for registration are symmetrical as shown in FIG. 17. When different biometric source types are used and different functions for false acceptance result, order is important in determining point co-ordinates and an axis relating to voice recognition false acceptance should be associated with a co-ordinate value for same.

Referring to FIG. 18, a process for improving security without requiring performance of additional steps by most individuals for use in accordance with the invention is shown. Once communication between the client computer 52 and the server 51 is established and a process is transmitted from the server 51 to the client computer 52, a user presents biometric information to a biometric input device in communication with the client computer 52. The information is characterised and the characterised information is transmitted to the server 51. The server 51 receives the characterised information and matches it against a template. When a successful registration occurs, user identification is made and the process is complete. When an unsuccessful registration occurs, the server transmits an indication of such to the client computer 52 executing the process provided thereto. Alternatively, another process is provided to the client computer form the server. The client computer prompts the user for another biometric information sample. Optionally, the system prompts for samples from each biometric information source a plurality of consecutive times.

For example, a user presents their index finger to a fingerprint scanner. The fingerprint is characterised. The characterisation is sent to the server 51 for registration. When the registration fails and access is denied, the server transmits an indication of such to the client computer 52. Optionally, along with the indication, another different characterisation process is provided to the client computer 52. The user again presents their index finger to the fingerprint scanner. When registration on the server again fails and access is denied, the server transmits an indication of such to the client computer 52. The user again presents their index finger to the fingerprint scanner. When registration on the server fails yet again and access is denied, the server transmits an indication of such to the client computer 52. Optionally, the server transmits another process for characterising a different biometric information sample. The user is prompted to present their middle finger to the fingerprint scanner. Alternatively, the user selects and identifies their middle finger as the next biometric information source. The biometric information sample is characterised and transmitted to the server 51. The registration of the characterised data derived from the biometric sample of the middle finger is performed according to the invention and therefore is not a same registration process as when the middle finger is the first finger presented to the scanner. The registration relies on the best registration value from the index fingerprints and, with the registration results from the middle finger, determines whether identification should proceed. When unsuccessful registration occurs, the server transmits an indication of such to the client computer according to the invention and the middle finger is presented up to two more times. When registration is still unsuccessful, another biometric source is requested or is selected by the user. Optionally, when registration results fall below a predetermined threshold, user identification fails. Alternatively, user identification fails when known biometric information sources of the user are exhausted. Of course, whenever a resulting registration value considered with previous registration values according to the process results in a sufficiently accurate identification, the user is identified.

Though in the previous description each biometric source supplies information thrice, this is only exemplary. Though the above example refers to an index finger and a middle finger, any fingers or other biometric information may be employed within a process as described above. Registration disclosed according to the above process is performed on the server 51. Biometric information input is provided on the client computer 52.

Advantages to this process are that, the convenience of current fingerprint registration systems is retained for a many individuals; for a number of individuals, an extra fingerprint sample from another finger is required; and, from a small number of individuals, several fingerprints are required. The number is dependent on fingerprint quality, fingerprint characterisation process, desired level of security, population size, etc. It is evident to those of skill in the art that when individuals are enrolled, biometric information from a plurality of biometric information sources is provided, characterised and associated/stored with their identification. This data is then stored accessible to the server 51.

Because of the nature of, for example, fingerprints, the use of multiple fingerprints from a same individual provides an additional correlation as discussed herein. In an embodiment, with each fingerprint presented, analysis and registration provides one of three results—identified, rejected, unsure. When unsure, more biometric information is requested. The individual provides additional fingerprint data and again one of the three results is provided. When an identification or rejection occurs, the process stops. Optionally, a log of access attempts is maintained for later review.

In a further refinement of the process, the client computer 52 prompts a user for their identity. When the user provides identification, the identification is provided to the server 51. A process from the server is selected based on the identity and transmitted to the client computer 52. The process is selected such that biometric information is requested from sources in an order that is most likely determinative of the user identity.

For example, when biometric information from an index finger is provided and registered but fails to sufficiently identify the user, further biometric information is requested. The biometric information requested is selected such that a highest likelihood of identification results. Alternatively, the biometric information source is selected such that a highest likelihood of rejection results. Should the next sample of biometric information fail to be determinative— identification or rejection, further biometric information from another source is requested again attempting to make a final determination fastest.

When a user identity is not provided, a data structure indicating a next biometric information source to request is produced from all biometric information. In dependence upon a registration value of a current biometric information sample, user identification, rejection, or requesting further biometric information results. In the latter case, the requested information is determined based on the known biometric information and registration values associated therewith. For example, biometric information is provided from a first biometric information source. Registration is performed and is inconclusive. It is determined that a particular biometric information source comprises information most likely to result in identification or failure thereby being determinative. The server 51 transmits an indication of the desired biometric information and that biometric information source is polled by the process executing on the client computer 52.

When selecting subsequent biometric information sources, preferably, all possible outcomes are analysed and the outcome of failed identification is not itself considered a single outcome but is weighted more heavily.

The data is arranged such that in dependence upon previous registration results a next biometric information source is polled. Using such a system, searching large databases for accurate registration is facilitated and reliability is greatly increased. Preferably, the database is precompiled to enhance performance during the identification process.

It is evident to those of skill in the art that the above processes require significant inter processor communication. This is a significant advantage of the present invention wherein the communication is included within the transmitted process. This obviates a need for synchronism between versions and algorithms executing on the server 51 and the client computer 52.

Numerous other embodiments may be envisaged without departing from the spirit and scope of the invention.

What is claimed is:

1. A method of enhancing network security comprising the steps of:
   (a) initiating a communication session between a first computer and a second other computer;
   (b) transmitting from the first computer to the second other computer in communication therewith a process for securing communications therebetween;
   (c) characterising biometric information received at the second other computer with the process and transmitting to the first computer data in dependence upon the characterisation; and,
   (d) securing communications on the first computer using a process for receiving the secured information and performing one of reversing the securing process and analysing the secured information on the first computer and associated with the transmitted process.

2. A method of enhancing network security as defined in claim 1 wherein the step of (d) securing communications on the first computer using a process associated with the transmitted process comprises the step of receiving the data, registering the data against templates of biometric information determined in accordance with a compatible characterisation process to produce a registration result and, when the registration result is within a predetermined range performing one of identifying a source of the biometric information and authorising the second other computer to access information stored on the first computer.

3. A method of enhancing network security comprising the steps of
   (a) initiating a communication session between a first computer and a second other computer;
   (b) transmitting from the first computer to the second other computer in communication therewith a process for characterising user authorisation information comprising a non reversible transformation of the information;
   (c) characterising user authorisation information received at the second other computer to produce data using the process for characterising user authorisation information;
   (d) transmitting the data to the first computer; and
   (e) comparing the data received by the first computer to information on the first computer to determine a value and when the value is within predetermined limits performing one of identifying a source of the authorisation information and authorising access from the second other computer to information secured by the first computer, wherein the user authorisation information is biometric information.

4. A method of enhancing network security as defined in claim 3 wherein the user authorisation information comprises a fingerprint.

5. A method of enhancing network security as defined in claim 3 comprising the step of
   providing data indicative of a user identity to the second other computer; and,
   transmitting the data indicative of a user identity to the first computer wherein the user authorisation information is biometric information, wherein the process is selected by the first computer in dependence upon data indicative of a user identity, and wherein the process for characterising user authorisation information transmitted to the second other computer comprises the step of extracting features from the biometric information.

6. A method of enhancing network security as defined in claim 3 wherein the user authorisation information is biometric information comprising the steps of
   providing a biometric information sample to a biometric input device in communication with the second other computer;
   providing data indicative of a biometric information source of the biometric information sample;
   providing data indicative of a user identity;
   transmitting to the first computer the data indicative of a user identity and the biometric information source;
   selecting a process from a plurality of processes associated with one of a plurality of templates associated with the identified biometric information source of the identified individual;
   and wherein the step of (e) performing one of identifying a source of the biometric information and authorising access from the second other computer to information secured by the first computer comprises the step of determining within predetermined level of security whether the biometric information provided is from a same individual as that identified.

7. A method of enhancing network security as defined in claim 3 wherein the user authorisation information is biometric information comprising the steps of
   providing data indicative of a user identity;
   wherein the process comprises one of a plurality of processes associated with the data indicative of a user identity and wherein the process comprises the step of:
      prompting the user to provide a biometric information sample from a predetermined biometric information source to a biometric input device in communication with the second other computer;
   and wherein the step of (e) performing one of identifying a source of the biometric information and authorising access from the second other computer to information secured by the first computer comprises the step of determining within predetermined level of security whether the biometric information provided is from a same individual as the user identity.

8. A method of enhancing network security as defined in claim 7 comprising the steps of:
   when the determination is not with a predetermined level of security, repeating steps (b), (c), (d) and (e).

9. A method of enhancing network security comprising the steps of
   (a) initiating a communication session between a first computer and a second other computer;
   (b) transmitting from the first computer to the second other computer in communication therewith a process for characterising biometric information;
   (c) providing a biometric information sample from a biometric information source to the second other computer using a biometric input device;
   (d) characterising the biometric information sample provided to the second other computer according to the process transmitted from the first computer to produce data;
   (e) transmitting the data to the first computer; and
   (f) comparing the data received by the first computer during the session to information on the first computer to determine with a predetermined level of security an identification of an individual by whom the biometric information sample was provided.

10. A method of improving network communication security for a system having a first computer in communications with a second other computer as defined in claim 9 comprising the step of replacing the process at intervals.

11. A method of enhancing network security as defined in claim 9 comprising the steps of:
   providing to the second other computer data indicative of a user identity; and
   transmitting to the first computer the data indicative of the user identity.

12. A method of enhancing network security as defined in claim 11 comprising the step of:
   selecting from a plurality of processes a process associated with the data indicative of a user identity wherein the process transmitted from the first computer to the second other computer is the selected process.

13. A method of enhancing network security as defined in claim 9 comprising the steps of:
   (c2) providing a second biometric information sample from a second other biometric information source to the second other computer using a biometric input device;
   (d2) characterising the second biometric information sample provided to the second other computer according to the process transmitted from the first computer to produce second data;
   (e2) transmitting the second data to the first computer; and
   wherein the step of (f) comparing the data received by the first computer during the session to information on the first computer to determine with a predetermined level of security an identification of an individual by whom the biometric information sample was provided comprises the steps of:
      registering data and a template to determine a registration value;
      registering second data and a second template to determine a second registration value;
      determining if a point in a multidimensional space and having co-ordinates corresponding substantially to the registration value and the second registration value falls within a multi-dimensional range determined in dependence upon a predetermined false acceptance rate.

14. A method of enhancing network security as defined in claim 9 comprising the steps of:
   (c2) providing a second biometric information sample from a second other biometric information source to the second other computer using a biometric input device;
   (d2) characterising the second biometric information sample provided to the second other computer according to the process transmitted from the first computer to produce second data;
   (e2) transmitting the second data to the first computer; and
   wherein the step of (f) comparing the data received by the first computer during the session to information on the first computer to determine with a predetermined level of security an identification of an individual by whom the biometric information sample was provided comprises the step of:
      determining within predetermined level of security whether the plurality of biometric information samples provided are from a same known individual.

15. A method of enhancing network security comprising the steps of
   (a) initiating a communication session between a first computer and a second other computer;
   (b) transmitting from the first computer to the second other computer in communication therewith a process for execution on the second other computer for characterising biometric information, the process comprising the steps of:
      accepting a first biometric information sample from a biometric source of the individual to a biometric input device in communication with a host processor, and
      using the processor of the second other computer, characterising the biometric information sample;
   (c) executing the process on the second other computer;
   (d) transmitting the characterised first biometric information to the first computer;
   (e) using the processor of the first computer, registering the characterised first biometric information sample with a first template to produce a first registration value;
   (f) when the first registration value is within predetermined limits, identifying the individual; and,
   (g) when the first registration value is within other predetermined limits, transmitting a signal indicative of such to the second other computer and performing the steps of:
      (g1) executing the process on the second other computer with another different biometric information source,
      (g2) transmitting the characterised first biometric information to the first computer,
      (g3) using the processor of the first computer, registering the current biometric information sample with a template to produce a current registration value,
      (g4) when the first registration value and the current registration value are within predetermined limits, identifying the individual, and
      (g5) when the first registration value and the current registration value are within second other predetermined limits, repeating step (g).

16. A method of improving network communication security for a system having a first computer in communications with a second other computer as defined in claim 15 comprising the step of replacing the process at intervals.

17. A method of enhancing network security as defined in claim 15 comprising the step of
   providing data indicative of a user identity to the second other computer; and,
   transmitting the data indicative of a user identity to the first computer wherein the process for characterising biometric information transmitted to the second other computer is selected by the first computer in dependence upon data indicative of a user identity.

18. A method of enhancing network security as defined in claim 15 wherein the step of
   (g) when the first registration value is within other predetermined limits, transmitting a signal indicative of such to the second other computer and performing the steps of:
      (g1) executing the process on the second other computer with another different biometric information source,
      (g2) transmitting the characterised first biometric information to the first computer,
      (g3) using the processor of the first computer, registering the current biometric information sample with a template to produce a current registration value, (g4) when the first registration value and the current registration value are within predetermined limits, identifying the individual, and (g5) when the first registration value and the current registration value are within second other predetermined limits, repeating step (g):

comprises the step of:

(g0) transmitting from the first computer to the second other computer in communication therewith a process for execution on the second other computer for characterising biometric information, the process comprises the steps of:

accepting a current biometric information sample from a biometric source of the individual to a biometric input device in communication with a host processor;

using the processor of the second other computer, characterising the current biometric information sample, wherein the process for characterising the current biometric information transmitted to the second other computer is selected by the first computer in dependence upon a previous registration value.

* * * * *

UNITED STATES PATENT AND TRADEMARK OFFICE
CERTIFICATE OF CORRECTION

PATENT NO. : 6,076,167
DATED : June 13, 2000
INVENTOR(S) : Borza

It is certified that error appears in the above-identified patent and that said Letters Patent is hereby corrected as shown below:

In sheet 9, Fig. 8,

- the reference numeral 11 should be applied to the fingers;
- the reference numeral 12 should be applied to the speaker; and,
- the reference numeral 13 should be applied to the eye.

In sheet 18, Fig. 17, the reference letter B should be applied to the shaded region.

Col. 9:
- Line 7, "name read" should read -- name to read --;
- Line 12, "DataOuputStream" should read -- DataOutputStream --;
- Line 18, "DataOuputStream" should read -- DataOutputStream --;
- Line 39, "characterise" should read -- *characterise* --.

Col. 14:
- Line 11, " $\geqq$ " should read -- $\geq$ --;
- Line 19, " $=$ " should read -- $\equiv$ --;
- Line 24, " $=$ " should read -- $\equiv$ --;
- Line 43, " $X_n$ " should read -- $x_n$ --;
- Lines 15, 26, and 40, "$\leqq$" should read --$\leq$ --.

Col. 18, lines 26, 41 and 54, " $\geqq$ " should read -- $\geq$ --.

UNITED STATES PATENT AND TRADEMARK OFFICE
CERTIFICATE OF CORRECTION

PATENT NO. : 6,076,167
DATED : June 13, 2000
INVENTOR(S) : Borza

It is certified that error appears in the above-identified patent and that said Letters Patent is hereby corrected as shown below:

Col. 19:
- Line 5, the signs "$\leqq$" should read --$\leq$--;
- Line 48, "X$\chi$" should read --$\chi_u$--.

Col. 20, line 20, "$\leqq$" should read --$\leq$--.

Signed and Sealed this

Twenty-ninth Day of May, 2001

Attest:

NICHOLAS P. GODICI

Attesting Officer       Acting Director of the United States Patent and Trademark Office